(12) United States Patent
Kadono et al.

(10) Patent No.: US 7,894,526 B2
(45) Date of Patent: Feb. 22, 2011

(54) MOTION ESTIMATION METHOD AND MOVING PICTURE CODING METHOD

(75) Inventors: Shinya Kadono, Nishinomiya (JP); Youji Shibahara, Sakai (JP)

(73) Assignee: Panasonic Corporation, Osaka (JP)

( * ) Notice: Subject to any disclaimer, the term of this patent is extended or adjusted under 35 U.S.C. 154(b) by 1413 days.

(21) Appl. No.: 11/063,871

(22) Filed: Feb. 23, 2005

(65) Prior Publication Data
US 2005/0190844 A1 Sep. 1, 2005

(30) Foreign Application Priority Data
Feb. 27, 2004 (JP) .............................. 2004-053588

(51) Int. Cl.
*H04N 7/12* (2006.01)
(52) U.S. Cl. ................................. 375/240.16
(58) Field of Classification Search ....................... None
See application file for complete search history.

(56) References Cited

U.S. PATENT DOCUMENTS 6,438,254 B1    8/2002   Kadona et al.
7,327,787 B1 *  2/2008   Chen et al. ............. 375/240.16

2003/0072374 A1*  4/2003  Sohm ..................... 375/240.16
2004/0008780 A1*  1/2004  Lai et al. ................ 375/240.16

FOREIGN PATENT DOCUMENTS

| JP | 11-355780 | 12/1999 |
| JP | 2000-188735 | 7/2000 |
| JP | 2000-333184 | 11/2000 |

* cited by examiner

*Primary Examiner*—David Czekaj
*Assistant Examiner*—James Pontius
(74) *Attorney, Agent, or Firm*—Wenderoth, Lind & Ponack, L.L.P.

(57) ABSTRACT

The motion vector estimation unit (106) is comprised of: an error calculation unit (202) that calculates errors SAD1 to SAD9 that are differences between the current block data tar_img and the respective neighboring reference block data ref_img; a minimum-error block determination unit (203) that determines, as a minimum-error block, a reference block that includes the smallest error of all the errors SAD1 to SAD9, and outputs a motion vector mvmin corresponding to the position of the determined minimum-error block; an end judgment unit (204) that judges whether or not the motion estimation should be ended; and a search center determination unit (205) that determines, as a reference block serving as the next search center, a reference block that is two pixels or more away from the current search center, according to the position of the minimum-error block.

12 Claims, 16 Drawing Sheets

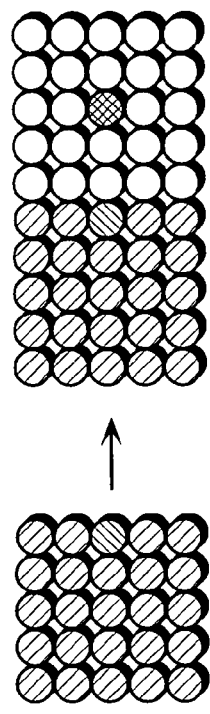
FIG. 5A
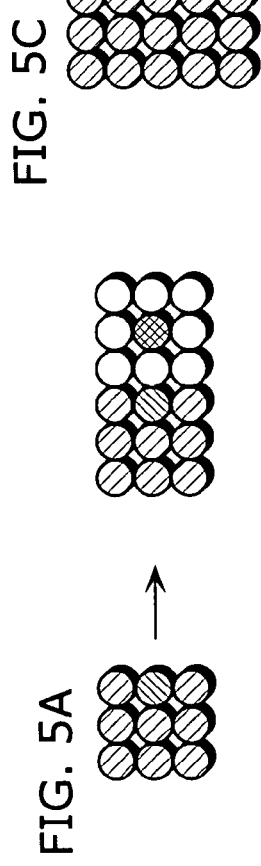
FIG. 5B
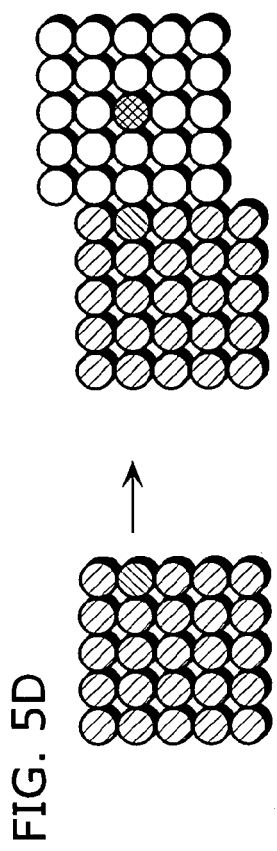
FIG. 5C
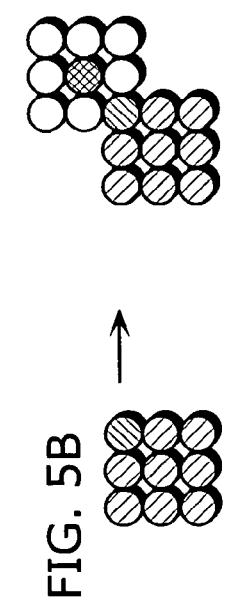
FIG. 5D
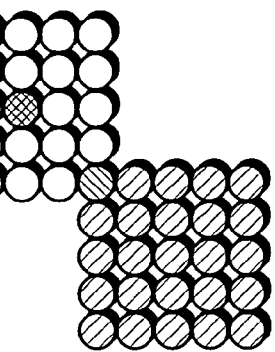
FIG. 5E
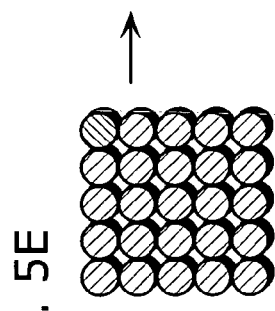
- Smallest SAD
- Search center already searched
- Search center
- Next search point

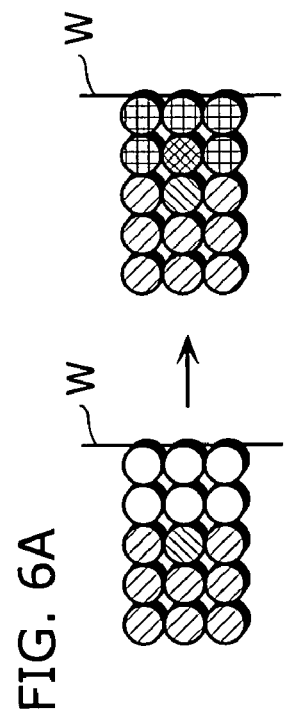
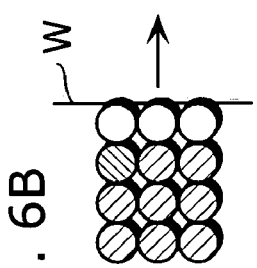
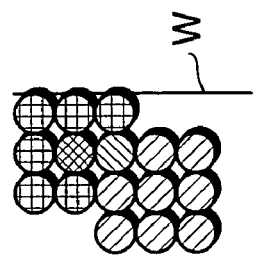
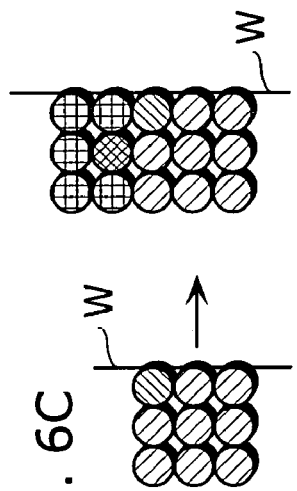

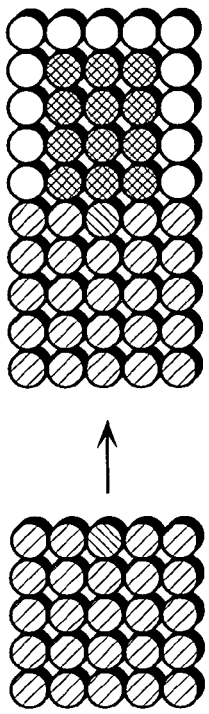
FIG. 7A
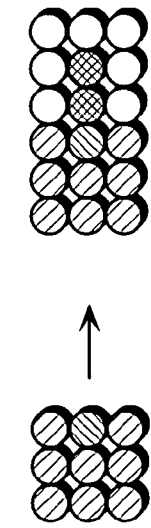
FIG. 7B
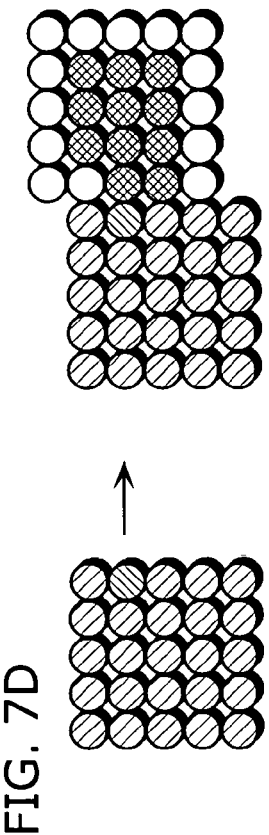
FIG. 7C
FIG. 7D
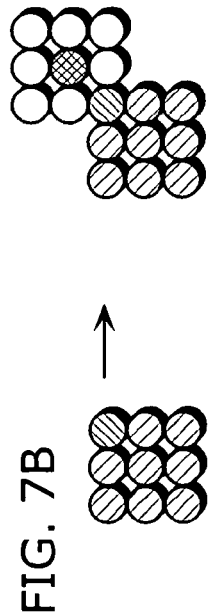
FIG. 7E
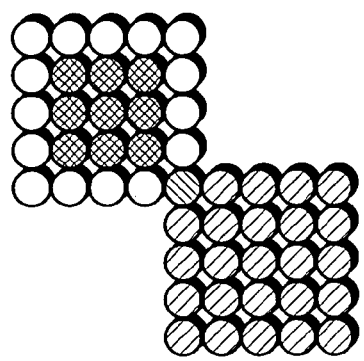
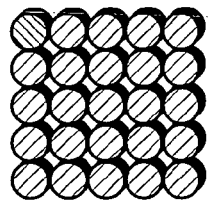
- Smallest SAD
- Already searched search center
- Point at which search is terminated if it is smallest SAD
- Current search point

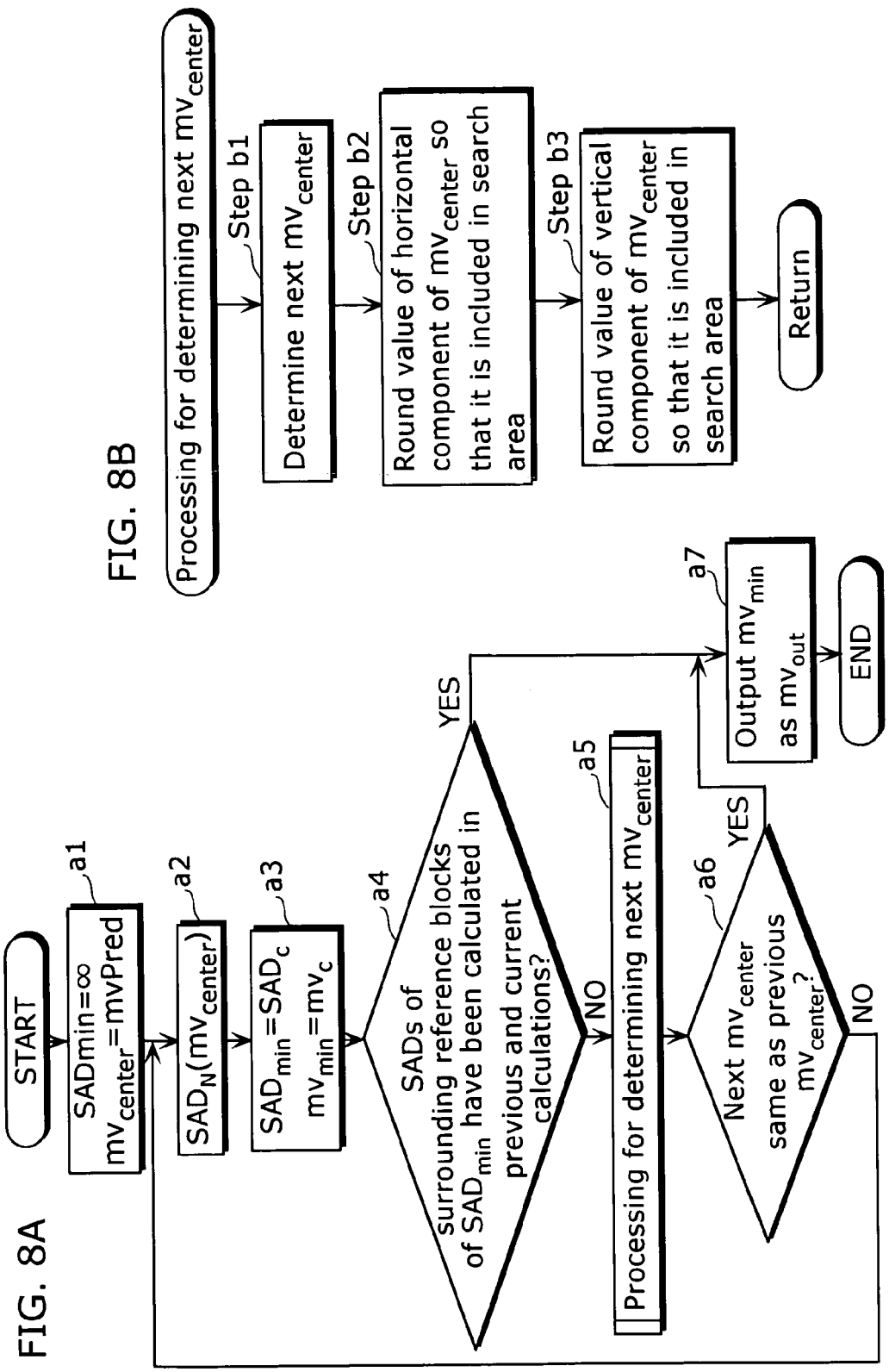

FIG. 9A

| $mv_{min} - mv_{center}$ | Next $mv_{center}$ |
|---|---|
| (-1,-1) | $mv_{center}+(-2,-2)$ |
| (0,-1) | $mv_{center}+(0,-3)$ |
| (1,-1) | $mv_{center}+(2,-2)$ |
| (-1,0) | $mv_{center}+(-3,0)$ |
| (0,0) | $mv_{center}$ |
| (1,0) | $mv_{center}+(3,0)$ |
| (-1,1) | $mv_{center}+(-2,2)$ |
| (0,1) | $mv_{center}+(0,3)$ |
| (1,1) | $mv_{center}+(2,2)$ |

FIG. 9B

| $mv_{min} - mv_{center}$ | Next $mv_{center}$ |
|---|---|
| (-2,-2) | $mv_{center}+(-4,-4)$ |
| (-1,-2) | $mv_{center}+(-1,-5)$ |
| (0,-2) | $mv_{center}+(0,-5)$ |
| (1,-2) | $mv_{center}+(1,-5)$ |
| (2,-2) | $mv_{center}+(4,-4)$ |
| (-2,-1) | $mv_{center}+(-5,-1)$ |
| (2,-1) | $mv_{center}+(5,-1)$ |
| (-2,0) | $mv_{center}+(-5,0)$ |
| (2,0) | $mv_{center}+(5,0)$ |
| (-2,1) | $mv_{center}+(-5,1)$ |
| (2,1) | $mv_{center}+(5,1)$ |
| (-2,2) | $mv_{center}+(-4,4)$ |
| (-1,2) | $mv_{center}+(-1,5)$ |
| (0,2) | $mv_{center}+(0,5)$ |
| (1,2) | $mv_{center}+(1,5)$ |
| (2,2) | $mv_{center}+(4,4)$ |

MOTION ESTIMATION METHOD AND MOVING PICTURE CODING METHOD

BACKGROUND OF THE INVENTION (1) Field of the Invention

The present invention relates to a motion estimation method that is used in a picture coding method and the like for efficiently compressing a moving picture signal by use of the correlation between pictures.

(2) Description of the Related Art

In the age of multimedia which integrally handles audio, video and other pixel values, existing information media, i.e., newspaper, magazine, television, radio, telephone and other means through which information is conveyed to people, have recently come to be included in the scope of multimedia. Generally, multimedia refers to something that is represented by associating not only characters, but also graphics, audio, and especially pictures and the like together. However, in order to include the aforementioned existing information media into the scope of multimedia, it appears as a prerequisite to represent such information in digital form.

However, when calculating the amount of information contained in each of the aforementioned information media as the amount of digital information, while the amount of information per character is 1 to 2 bytes in the case of characters, the amount of information to be required is 64 Kbits per second in the case of audio (telephone quality), and 100 Mbits per second in the case of moving pictures (current television reception quality). Therefore, it is not realistic for the aforementioned information media to handle such an enormous amount of information as it is in digital form. For example, although video phones are already in the actual use by using Integrated Services Digital Network (ISDN) which offers a transmission speed of 64 Kbits/s to 1.5 Mbits/s, it is not practical to transmit video of televisions and cameras directly through ISDN.

Against this backdrop, information compression techniques have become required, and moving picture compression techniques compliant with H.261 and H.263 standards recommended by ITU-T (International Telecommunication Union-Telecommunication Standardization Sector) are employed for video phones, for example. Moreover, according to information compression techniques compliant with the MPEG-1 standard, it is possible to store picture information into an ordinary music CD (compact disc) together with sound information.

Here, MPEG (Moving Picture Experts Group) is an international standard on compression of moving picture signals standardized by ISO/IEC (International Organization for Standardization, International Electrotechnical Commission), and MPEG-1 is a standard for compressing television signal information approximately into one hundredth so that moving picture signals can be transmitted at a rate of 1.5 Mbit/s. Furthermore, since a transmission speed achieved by the MPEG-1 standard is a middle-quality speed of about 1.5 Mbit/s, MPEG-2, which was standardized with a view to satisfying requirements for further improved picture quality, allows data transmission equivalent in quality to television broadcasting through which moving picture signals are transmitted at a rate of 2 to 15 Mbit/s. Moreover, MPEG-4 was standardized by the working group (ISO/IEC JTC1/SC29/WG11) which promoted the standardization of MPEG-1 and MPEG-2. MPEG-4, which provides a higher compression ratio than that of MPEG-1 and MPEG-2 and which enables an object-based coding/decoding/operation, is capable of providing a new functionality required in this age of multimedia. At the beginning stage of standardization, MPEG-4 aimed at providing a low bit rate coding method, but it has been extended as a standard supporting more general coding that handles interlaced images as well as high bit rate coding. Currently, an effort has been made jointly by ISO/IEC and ITU-T for standardizing MPEG-4 AVC and ITU-T H.264 as picture coding methods of the next generation that offer a higher compression ratio. As of August 2002, a committee draft (CD) is issued for a picture coding method of the next generation.

In general, in coding of a moving picture, the amount of information is compressed by reducing redundancies in temporal and spatial directions. Therefore, in inter picture prediction coding aiming at reducing temporal redundancies, motion estimation and the generation of a predictive image are carried out on a block-by-block basis with reference to forward or backward picture(s), and coding is then performed on the difference value between the obtained predictive image and an image in the current picture to be coded. Here, "picture" is a term denoting one image.

A picture to be coded using intra picture prediction without generating any predictive images shall be referred to as an I picture. A picture to be coded using inter picture prediction with reference to only one picture shall be referred to as a P picture. And, a picture to be coded using inter picture prediction with reference to two pictures at the same time shall be referred to as a B picture. It is possible for a B picture to refer to two pictures which can be arbitrarily combined from forward/backward pictures in display order.

P pictures and B pictures are coded using motion compensated inter picture prediction. Coding by use of motion compensated inter picture prediction is a coding method that employs motion compensation in inter picture prediction coding. Unlike a method for performing prediction simply based on pixel values in a reference picture, motion estimation is a technique capable of improving prediction accuracy as well as reducing the amount of data by estimating the amount of motion (hereinafter referred to as "motion vector") of each part within a picture and further by performing prediction in consideration of such amount of motion. For example, it is possible to reduce the amount of data through motion compensation by estimating motion vectors of the current picture to be coded (hereinafter also referred to simply as "current picture") and then by coding prediction residuals between prediction values obtained by making a shift by the amount equivalent to the respective motion vectors and the current picture. In this technique, motion vectors are also recorded or transmitted in coded form, since motion vector information is required at the time of decoding.

Motion vectors are estimated on a per-block basis. More specifically, a block shall be previously fixed in the current picture, so as to estimate motion vectors by finding the position of the most similar reference block of such fixed block within the search area in a reference picture. This processing for searching for motion vectors is called "motion estimation".

FIG. 1 is a schematic diagram for illustrating motion estimation. The position of a block in a reference picture that is most similar to the current block is estimated by comparing the current block with arbitrary blocks in the reference picture. In general, the judgment of whether the current block and a reference block are similar or not is made based on comparative error between them, especially summed absolute difference (SAD). If all the reference blocks in a reference picture are searched, an enormous amount of computation is required. Thus, the scope of search is limited to a certain area within each reference picture. Such limited area is referred to as a search area.

Motion estimation is known as a process that requires the largest amount of computation of all the processes of moving picture coding. For this reason, there have been proposed many methods for reducing the amount of computation required for motion estimation. As one of such methods, sequential search, which requires a small amount of computation, is often used for devices such as mobile terminal with low computation power (e.g. refer to Japanese Laid-Open Patent application No. 2000-333184).

FIG. 2 is a schematic diagram showing how reference blocks in which a search is to be performed and a reference block serving as a search center shift according to a conventional motion estimation method. In this drawing, each circle represents the position of the pixel located at the upper left in each reference block. The position of each reference block is indicated by such circle in a simplified manner. Also in the drawing, each number represents the position of each reference block for which a SAD should be calculated along with the shift of a reference block serving as a search center in an example described below.

(1) First, a SAD is computed for a reference block Ba that is located at a search start position X, as well as for each of the reference blocks Bb, Bc, Bd, and Be that are located at positions to be reached by making a one-pixel shift to each of the up, down, left, and right directions from the reference block Ba (such positions are hereinafter referred to simply as up position, down position, left position, and right position, respectively, or collectively as up/down/left/right positions). When the SAD of the reference block Bc located at the right position is the smallest of all the SADs of the reference blocks Ba to Be, for example, the search center is shifted to the right. (2) Next, a SAD is determined for each of the reference blocks located at the up/down/left/right positions with respect to the reference block serving as the new search center (here, the reference block Bc), and the search center is shifted to the right if the SAD of the reference block located at the right position is the smallest. (3) Next, a SAD is determined for each of the reference blocks located at the up/down/left/right positions with respect to the reference block serving as the new search center, and the search center is shifted to the right if the SAD of the reference block located at the right position is the smallest. (4) Next, a SAD is determined for each of the reference blocks located at the up/down/left/right positions with respect to the reference block serving as the new search center, and the search center is shifted downward if the SAD of the reference block located at the down position is the smallest. (5) Next, a SAD is determined for each of the reference blocks located at the up/down/left/right positions with respect to the reference block serving as the new search center, and the search center is shifted downward if the SAD of the reference block located at the down position is the smallest. (6) Next, a SAD is determined for each of the reference blocks located at the up/down/left/right positions with respect to the reference block serving as the new search center, and the search center is shifted to the right if the SAD of the reference block located at the right position is the smallest. (7) Next, a SAD is determined for each of the reference blocks located at the up/down/left/right positions with respect to the reference block serving as the new search center, and the search center is shifted to the right if the SAD of the reference block located at the right position is the smallest. (8) Next, a SAD is determined for each of the reference blocks located at the up/down/left/right positions with respect to the reference block serving as the new search center, and the search center is shifted downward if the SAD of the reference block located at the down position is the smallest. (9) Next, a SAD is determined for each of the reference blocks located at the up/down/left/right positions with respect to the reference block serving as the new search center, and the search is terminated if the SAD of the reference block serving as the current search center is the smallest. Accordingly, the position Y of such reference block serving as the current search center is regarded as the position with the smallest SAD, i.e., an optimum motion vector.

However, since sequential search as described above has a problem that motion estimation cannot be performed at high speed, because the search center shifts only by one pixel per search and therefore the reference block serving as a search center is required to be shifted to another reference block for many times for performing motion estimation on pictures with large motion.

SUMMARY OF THE INVENTION

The present invention has been conceived in view of the above problem, and it is an object of the present invention to provide a motion estimation method, a motion estimation apparatus, and the like that are capable of performing motion estimation at high speed.

In order to achieve the above object, the motion estimation method according to the present invention is a motion estimation method for estimating, on a block-by-block basis, a motion vector that indicates an amount of motion between pictures that constitute a moving picture, that method being comprised of: calculating an error between a current block and a reference block and an error between the current block and each of neighboring reference blocks of the reference block, the current block being included in a current picture on which motion estimation is performed, and the reference block being included in a reference picture and serving as a current search center; determining a minimum-error block that is a reference block with a smallest error of all the errors calculated in that calculating; judging whether or not the motion estimation should be ended; determining, as a next search center, a reference block that is away from the reference block serving as the current search center by two pixels or more, depending on a position of the minimum-error block, and causing that calculating to be executed again; and determining a motion vector indicating the position of the minimum-error block as a motion vector to be estimated, in the case where it is judged in that judging that the motion estimation should be ended.

Preferably, in the judging in the above method, it is judged that the motion estimation should be ended in one of the following cases: all reference blocks surrounding the minimum-error block are the reference blocks whose errors have been calculated in that calculating based on a reference block serving as a previous search center and the reference block serving as the current search center; and the reference block determined to serve as the next search center is same as the reference block serving as the previous search center.

Furthermore, in the above method, the neighboring reference blocks may be: reference blocks that are away from the reference block serving as the current search center by i pixel to left and right horizontally, respectively, where i is a natural number that is equal to or smaller than P that is a natural number; reference blocks that are away from the reference block serving as the current search center by j pixel to up and down vertically, respectively, where j is a natural number that is equal to or smaller than Q that is a natural number; and reference blocks that are away from the reference block serving as the current search center by i pixel to left and right horizontally, respectively, and by j pixel to up and down vertically, respectively, and in the calculating, the errors may be calculated in parallel for a total of (2P+1)×(2Q+1) reference blocks which are the reference block serving as the current search center and the neighboring reference blocks.

Accordingly, since it is possible to reduce the number of times for which a reference block serving as a search center is shifted to another reference block, it becomes possible to achieve high-speed motion estimation. As a result, it becomes possible to perform motion estimation within a predetermined length of time even if the current block includes large motion, for example. Furthermore, since an error calculation is performed on a reference block serving as the search center and on each of its neighboring reference blocks, no reference block is skipped without error calculation when a reference block that is away from the current search center by two pixels or more is determined as the next search center.

Note that since errors are calculated in parallel on (2P+1)×(2Q+1) reference blocks, a larger amount of computation is required to be performed each time a reference block serving as a search center is shifted to another reference block, than in the case of the conventional methods. Time required for performing sequential search is dedicated for reading out pixel values and for performing error calculations. However, while the time required for the latter can be reduced by increasing the number of calculation units, time required for the former cannot be reduced. In other words, time required for reading out pixel values causes the time for shifting a search center to get long in sequential search. Thus, the structure of the present invention is useful for supporting large motion within a predetermined length of time.

Note that not only is it possible to embody the present invention as a motion estimation method as described above, but also as a motion estimation apparatus that includes, as its units, the steps included in the above motion estimation method, as well as a moving picture coding method for performing the motion estimation method and as a program that causes a computer to execute the steps included in the motion estimation method. It should be noted that such program can be distributed on a recording medium such as a CD-ROM an over a transmission medium such as the Internet.

As described above, according to the motion estimation method of the present invention, it is possible to reduce the number of times for which a reference block serving as a search center is shifted to another reference block, thereby achieving fast motion estimation. Thus, the practical value of the present invention is significant, since the present invention makes it possible to perform motion estimation within a predetermined length of time even if the current block includes large motion, for example.

The disclosure of Japanese Patent Application No. 2004-053588 filed on Feb. 27, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIGS. 5A to 5E are schematic diagrams showing how reference blocks in which a search is to be performed and a reference block serving as a search center shift in the motion estimation method according to the present invention, where FIG. 5A shows the case where a minimum-error block is located in the position indicated by the pixel in the right center when error calculations are performed in parallel on 9 reference blocks, FIG. 5B shows the case where a minimum-error block is located in the position indicated by the pixel in the upper right corner when error calculations are performed in parallel on 9 reference blocks, 5C shows the case where a minimum-error block is located in the position indicated by the pixel in the right center when error calculations are performed in parallel on 25 reference blocks, FIG. 5D shows the case where a minimum-error block is located in the position indicated by the second pixel from the upper right corner when error calculations are performed in parallel on 25 reference blocks, and FIG. 5E shows the case where a minimum-error block is located in the position indicated by the pixel in the upper right corner when error calculations are performed in parallel on 25 reference blocks;

FIGS. 6A to 6C are schematic diagrams showing how reference blocks in which a search is to be performed and a reference block serving as a search center shift in the motion estimation method according to the present invention, where 6A shows the case where a minimum-error block is located in the position indicated by the pixel in the right center and there is a boundary in the search area, and FIGS. 6B and 6C show the case where a minimum-error block is located in the position indicated by the pixel in the upper right corner and there is a boundary in the search area;

FIGS. 7A to 7E are schematic diagrams showing how motion estimation according to the motion estimation method of the present invention is ended, where FIG. 7A shows the case where the minimum-error block in the previous error calculation is located in the position indicated by the pixel in the right center when error calculations are performed in parallel on 9 reference blocks, FIG. 7B shows the case where the minimum-error block in the previous error calculation is located in the position indicated by the pixel in the upper right corner when error calculations are performed in parallel on 9 reference blocks, 7C shows the case where the minimum-error block in the previous error calculation is located in the position indicated by the pixel in the right center when error calculations are performed in parallel on 25 reference blocks, FIG. 7D shows the case where the minimum-error block in the previous error calculation is located in the position indicated by the second pixel from the upper right corner when error calculations are performed in parallel on 25 reference blocks, and FIG. 7E shows the case where the minimum-error block in the previous error calculation is located in the position indicated by the pixel in the upper right corner when error calculations are performed in parallel on 25 reference blocks;

FIG. 8A is a flowchart showing a flow of operations for performing motion estimation;

FIG. 8B is a flowchart showing a flow of operations, performed as part of the motion estimation operations shown in FIG. 8A, for determining a reference block serving as the next search center;

FIGS. 9A and 9B are diagrams showing an example conversion table, held by a search center determination unit, for determining a reference block serving as the next search center, where FIG. 9A shows the case where an error calculation is performed between the current block and each of 9 reference blocks, and FIG. 9B shows the case where an error calculation is performed between the current block and each of 25 reference blocks;

FIG. 12A shows an example physical format of the flexible disk as a recording medium itself, FIG. 12B shows an external view of the flexible disk viewed from the front, a schematic cross-sectional view, and the flexible disk, and FIG. 12B shows a structure for recording and reading out the program on and from the flexible disk FD;

DESCRIPTION OF THE PREFERRED EMBODIMENTS

The following describes the embodiments of the present invention with reference to the drawings.

First Embodiment

Figure 3:
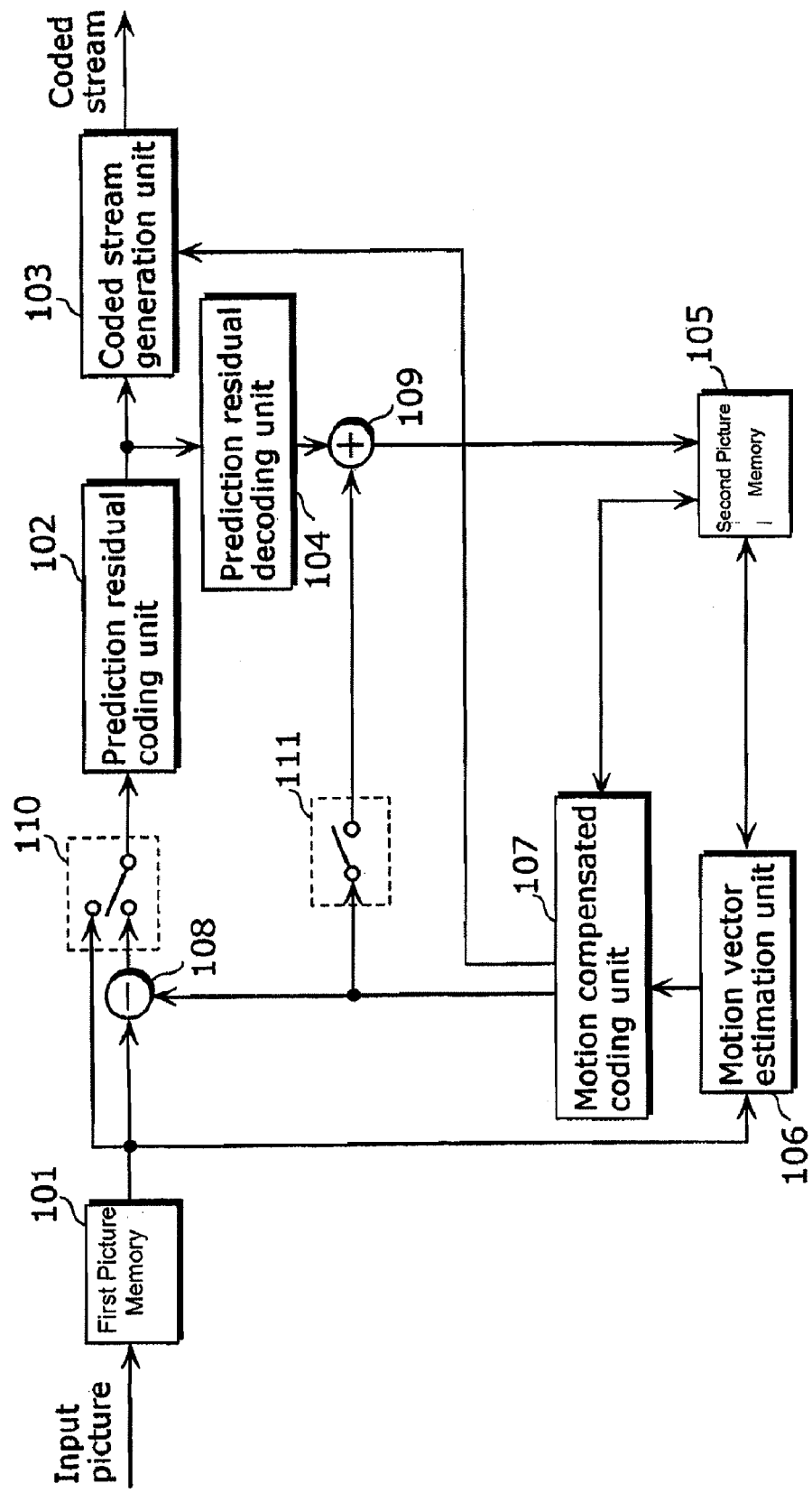
FIG. 3 is a block diagram showing a structure of a moving picture coding apparatus that uses a motion estimation method according to a first embodiment of the present invention.

FIG. 3 is a block diagram showing a structure of a moving picture coding apparatus that uses a motion estimation method according to the first embodiment of the present invention.

The moving picture coding apparatus is comprised of a first picture memory 101, a prediction residual coding unit 102, a coded stream generation unit 103, a prediction residual decoding unit 104, a second picture memory 105, a motion vector estimation unit 106, a motion compensated coding unit 107, a difference calculation unit 108, an addition unit 109, and switches 110 and 111.

The first picture memory 101 holds a moving picture that is inputted on a picture-by-picture basis in display order.

The motion compensated coding unit 107 determines a coding mode used for each block, based on a motion vector estimated by the motion vector estimation unit 106, and generates predictive image data (predictive pixel values) based on the determined coding mode. For example, in the case of inter-picture prediction coding mode that uses two reference pictures, the motion compensated coding unit 107 determines the pixel values of two reference blocks in two reference pictures, using motion vectors estimated by the motion vector estimation unit 106, and generates predictive image data.

The difference calculation unit 108 calculates a difference between image data read from the first picture memory 101 and predictive image data inputted from the motion compensated coding unit 107, and generates prediction residual image data.

The prediction residual coding unit 102 performs coding processes such as frequency transformation and quantization on the inputted prediction residual image data, and generates coded data. The coded stream generation unit 103 performs variable length coding and the like on the inputted coded data, and generates a coded stream that is added with motion vector information and coding mode information, and the like inputted from the motion compensated coding unit 107.

The prediction residual decoding unit 104 performs decoding processes such as inverse quantization and inverse frequency transformation on the input coded data, and generates decoded difference image data. The addition unit 109 adds the decoded difference image data inputted from the prediction residual decoding unit 104 and the predictive image data inputted from the motion compensated coding unit 107, and generates decoded image data. The second picture memory 105 stores decoded image data.

The motion vector estimation unit 106 uses the code decoded image data as a reference picture, and estimates, in a search area within such reference picture, a motion vector indicating the amount of motion to the position of an image area in the reference picture that is most similar to the input current block.

Figure 4:
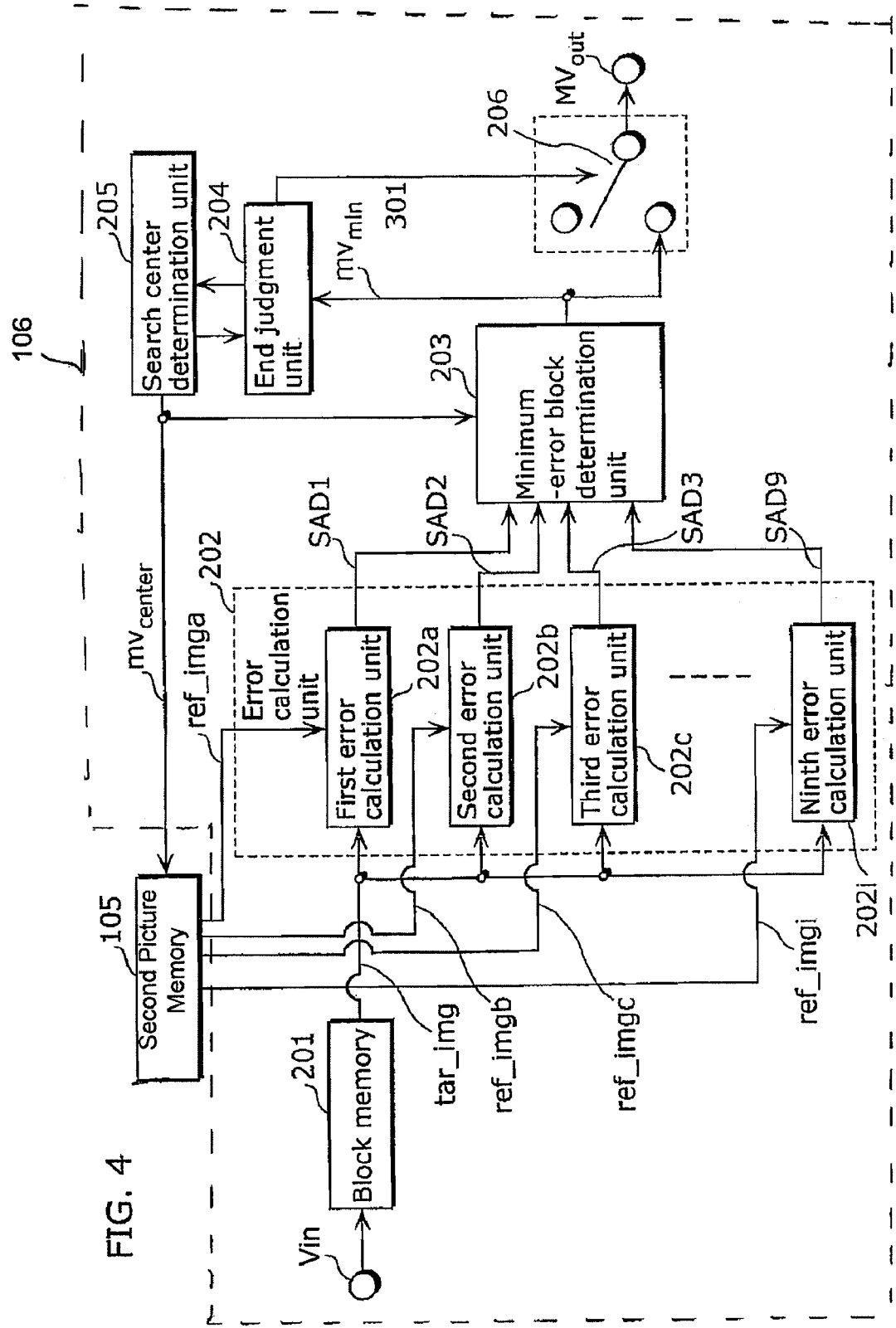
FIG. 4 is a block diagram showing a structure of a motion vector estimation unit that uses the motion estimation method according to the first embodiment of the present invention.

FIG. 4 is a block diagram showing a structure of the motion vector estimation unit 106.

The motion vector estimation unit 106 has a block memory 201, an error calculation unit 202, a minimum-error block determination unit 203, an end judgment unit 204, a search center determination unit 205, and a switch 206.

The block memory 201 holds an input current picture Vin, on a block-by-block basis.

The error calculation unit 202 has a first error calculation unit 202a, a second error calculation unit 202b, a third error calculation unit 202c, . . . , and a ninth error calculation unit 202i. These error calculation units 202a to 202i calculate an error SAD1, an error SAD2, an error SAD3, . . . , and an error SAD9, respectively, which are differences between the current block data tar_img inputted from the block memory 201 and each of the following nine neighboring reference block data that are inputted from the picture memory 105: reference block data ref_imga, reference block data ref_imgb, reference block data ref_imgc, . . . , and reference block data ref_imgi. Note that in the present embodiment, these error calculations are performed in parallel on a total of nine reference blocks: one reference block serving as a search center and its eight neighboring reference blocks that are located at positions away from the search center by one pixel each in the up, down, left, and right directions and in the four slanting directions.

The minimum-error block determination unit 203 determines a reference block with the smallest error (hereinafter referred to as "minimum-error block") from among the errors SAD1, SAD 2, SAD3, . . . , and SAD9 calculated by the error calculation unit 202, and outputs a motion vector mvmin that indicates the amount of motion to the current block corresponding to the position of the determined minimum-error block.

The search center determination unit 205 determines, as the next search center, a reference block that is two or more pixels away from the reference block serving as the current search center, depending on the position of the minimum-error block determined by the minimum-error block determination unit 203.

Figure 1:
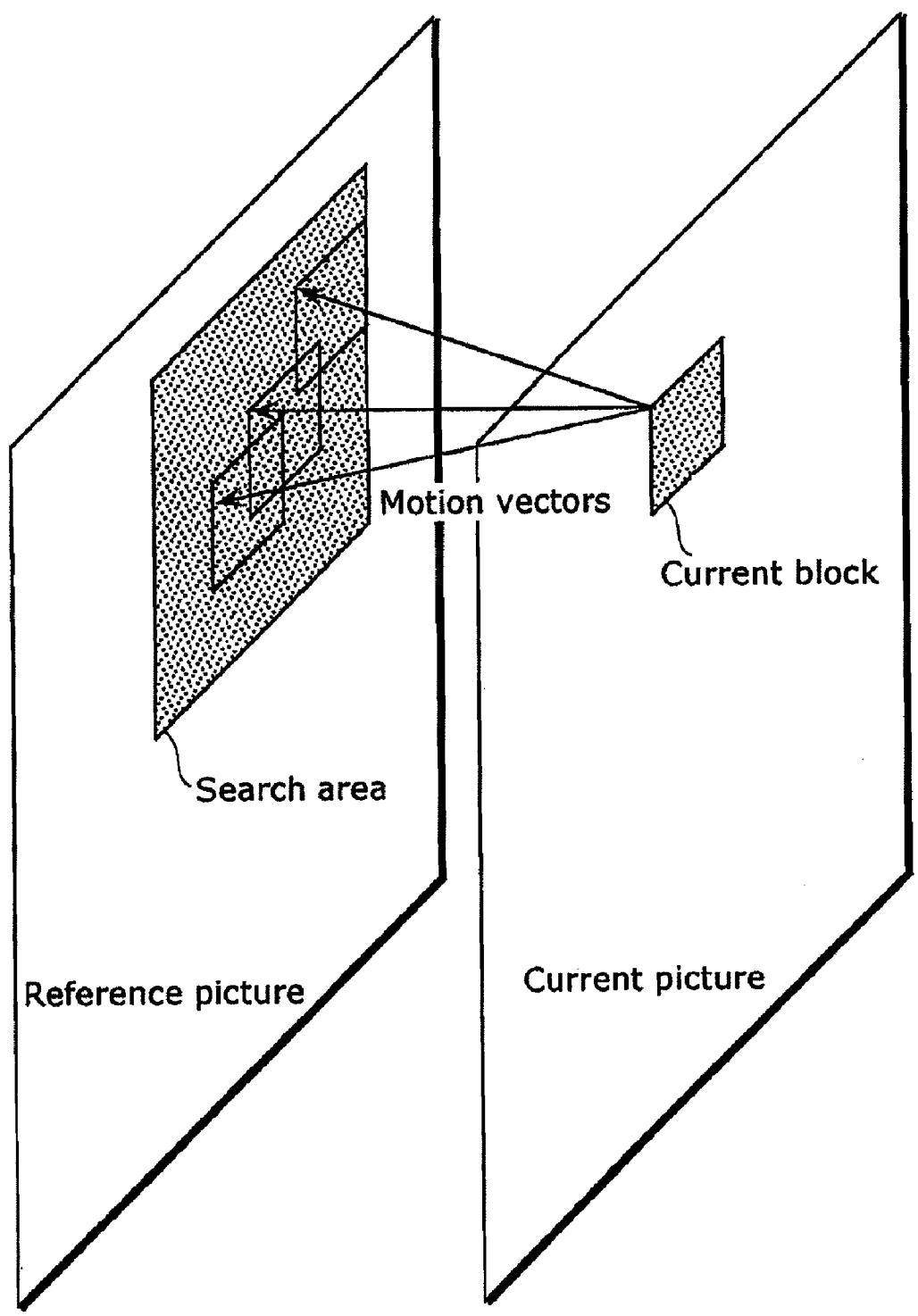
FIG. 1 is a schematic diagram for illustrating motion estimation.
Figure 2:
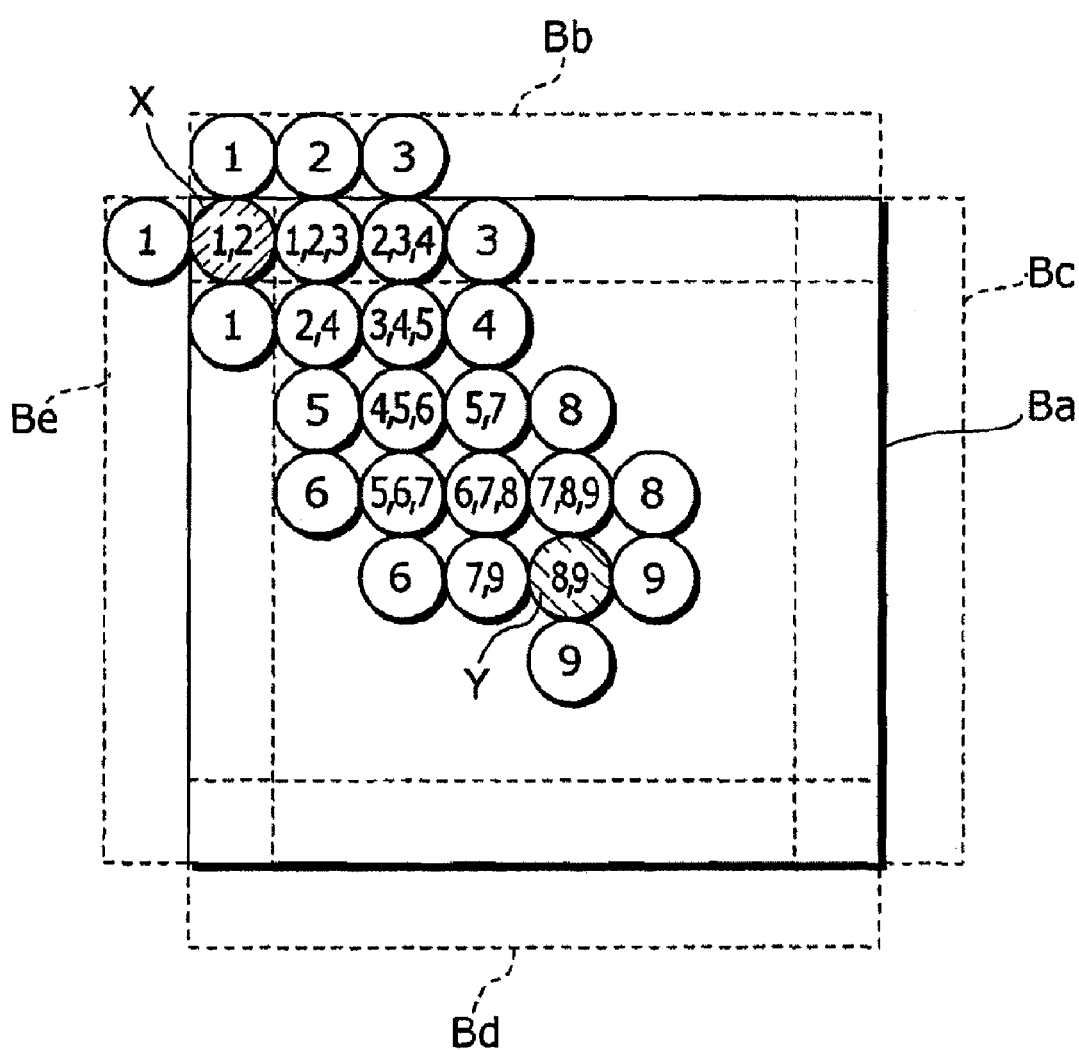
FIG. 2 is a schematic diagram showing how reference blocks in which a search is to be performed and a reference block serving as a search center shift according to a conventional motion estimation method.

FIGS. 5A and 5B are schematic diagrams showing how reference blocks in which a search is to be performed and a reference block serving as a search center shift according to the motion estimation method of the present invention. FIG. 5A shows the case where the minimum-error block is located in the position indicated by the pixel in the right center, whereas FIG. 5B shows the case where the minimum-error block is located in the position indicated by the pixel in the upper right corner. Similarly, FIGS. 6A to 6C are schematic diagrams showing how reference blocks in which a search is to be performed and a reference block serving as a search center shift. FIG. 6A shows the case where the minimum-error block is located in the position indicated by the pixel in the right center and where there is a boundary in the search area, whereas FIGS. 6B and 6C show the case where the minimum-error block is located in the position indicated by the pixel in the upper right corner and where there is a boundary in the search area. In FIGS. 5A to 5E and 6A to 6C, each circle represents the position of the pixel located in the upper left in each reference block, and the position of each reference block is indicated by such circle in a simplified manner, as in the case of FIG. 1.

For example, in the case where the minimum-error block is located in the position indicated by the pixel in the right center as shown in FIG. 5A, the search center determination unit 205 determines, as the next search center, a reference block that is away from the current search center by three pixels in the right direction. Meanwhile, in the case where the minimum-error block is located in the position indicated by the pixel in the upper right corner as shown in FIG. 5B, the search center determination unit 205 determines, as the next search center, a reference block that is away from the current search center by two pixels in the right direction and two pixels in the up direction, respectively.

In the present embodiment, the search center determination unit 205 holds information related to a method of making the above determination in the form of, for example, a conversation table as shown in FIG. 9A, which is referred to at the time of determining a reference block serving as the next search center. As FIG. 9A shows, the following information are associated with each other in such conversation table: a difference between the motion vector mvmin of each minimum-error block and the motion vector mvcenter of each reference block serving as the current search center; and the motion vector mvcenter of each reference block serving as the next search center (the motion vector mvcenter of the reference block serving as the current search center+the amount of motion from the motion vector mvcenter). Note that the present embodiment is applicable as long as at least a difference and the amount of motion are associated with each other in the conversion table.

Furthermore, the search center determination unit 205 determines, as the next search center, a reference block that is included in a predetermined search area.

For example, as shown in FIG. 6A, in the case where the minimum-error block is located in the position indicated by the pixel in the right center, and the boundary of the search are is located two pixels away therefrom in the right direction, the search center determination unit 205 determines, as the next search center, a reference block that is reached by making a three-pixel shift to the right first and then by making a one-pixel shift to the left from the current search center, respectively, so that all of the nine reference blocks to be searched will be included in the search area. This means that the next search center is located two pixels away from the current search center in the right direction. Note that the boundary W of the search area shown in FIGS. 6A to 6C indicates whether or not a reference block will not be included in the search area, if the upper left pixel in the reference block comes in the position shown in each of FIGS. 6A to 6C.

Meanwhile, as shown in FIG. 6B, in the case where the minimum-error block is located in the position indicated by the pixel in the upper right corner and the boundary of the search area is one pixel away therefrom in the right direction, the search center determination unit 205 determines, as the next search center, a reference block that is reached by making a two-pixel shift to the right, then by making a two-pixel shift to the up direction, and finally by making a one-pixel shift to the left from the current search center, respectively, so that all of the nine reference blocks to be searched will be included in the search area. This means that the next search center is located away from the current search center by one pixel in the right direction and two pixels in the up direction.

As shown in FIG. 6C, in the case where the minimum-error block is located in the position indicated by the pixel in the upper right corner, and reference blocks that are currently searched are located at the boundary of the search area, the search center determination unit 205 determines, as the next search center, a reference block that is reached by making a two-pixel shift to the right, then by making a two-pixel shift to the up direction, and finally by making a two-pixel shift to the left from the current search center, respectively, so that all of the nine reference blocks to be searched will be included in the search area. This means that the next search center is located away from the current search center by two pixels in the up direction.

The end judgment unit 204 judges whether motion estimation should be ended or not. In the case where motion estimation should be ended, the end judgment unit 204 turns the switch 206 ON, whereas in the case where motion estimation should not be ended, it turns the switch 206 OFF. While the switch 206 is ON, a motion vector mvmin outputted from the minimum-error block determination unit 203 is outputted as a motion vector MVout estimated by the motion vector estimation unit 106.

The end judgment unit 204 judges that motion estimation should be ended in one of the following cases: all of the surrounding reference blocks of the minimum-error block are reference blocks whose errors have been calculated in the previous and current error calculations; and a reference block determined by the search center determination unit 205 as the next search center is the reference block serving as the previous search center.

FIGS. 7A and 7B are schematic diagrams showing the case where the end judgment unit 204 judges that motion estimation in the motion estimation method according to the present invention should be ended. FIG. 7A shows the case where the minimum-error block in the previous error calculation is located in the position indicated by the pixel in the right center, whereas FIG. 7B shows the case where the minimum-error block in the previous error calculation is located in the position indicated by the pixel in the upper right corner.

The end judgment unit 204 judges that motion estimation should be ended in the case, as shown in FIG. 7A, for example, where the minimum-error block in the previous error calculation is the reference block located in the position indicated by the pixel in the right center and where the minimum-error block in the current error calculation is the reference block serving as the current search center or located in the position indicated by the pixel in the left center. The end judgment unit 204 also judges that motion estimation should be ended in the case, as shown in FIG. 7B, for example, where the minimum-error block in the previous error calculation is the reference block located in the position indicated by the pixel in the upper right corner and where the minimum-error block in the current error calculation is the reference block serving as the current search center.

Next, a description is given of operations performed by the motion vector estimation unit 106 of the moving picture coding apparatus with the above structure.

FIG. 8A is a flowchart showing a flow of operations for estimating motion, whereas FIG. 8B is a flowchart showing a flow of operations, performed as part of such motion estimation operations, for determining a reference block serving as the next search center.

First, the minimum error SADmin is initialized to ∞, and the initial value mvPred of a reference block serving as a search center is substituted to the value of a search center mvcenter (Step a1). Next, an error is calculated between the current block and the reference block serving as the current search center and between the current block and each of N surrounding reference blocks of the reference block serving as the current search center (Step a2). In the present embodiment, an error is calculated between the current block and each of the nine reference blocks as described above. In other words, the error calculation units 202 calculates an error SAD1, an error SAD2, an error SAD3, . . . , and an error SAD9, respectively, which are differences between the current block data tar_img inputted from the block memory 201 and the reference block serving as a search center inputted from the picture memory 105, and between the current block data tar_imag and each of the reference block data of the neighboring reference blocks of the reference block serving as the search center, inputted from the picture memory 105, i.e., reference block data ref_imga, reference block data ref_imgb, reference block data ref_imgc, . . . , and reference block data ref_imgi.

Next, the minimum-error block determination unit 203 (i) determines a minimum-error block whose error is the smallest among the minimum-error SADmin determined in the previous calculation (the first minimum-error SADmin is ∞) and the errors SAD1, SAD2, SAD3, . . . , and SAD9 calculated by the error calculation unit 202, and (ii) using the determined error SADc as the minimum-error SADmin, outputs, as the motion vector mvmin, the motion vector mvc indicating the amount of motion to the current block located in the position corresponding to the minimum-error SADmin (Step a3).

Next, the end judgment unit 204 judges whether or not all of the surrounding reference blocks of the minimum-error block are reference blocks whose errors have been calculated in the current and previous error calculations (Step a4). If the judgment in Step a4 is that all of the surrounding reference blocks of the minimum-error block are reference blocks whose errors have been calculated in the current and previous error calculations (YES in Step a4), the end judgment unit 204 ends the motion estimation, and outputs the motion vector mvmin of the minimum-error block as the motion vector MVout estimated by the motion vector estimation unit 106 (Step a7).

Meanwhile, if the judgment in Step a4 is that the surrounding reference blocks of the minimum-error block are not the reference blocks whose errors have been calculated in the current and previous error calculations (NO in Step a4), the search center determination unit 205 performs processing for determining a reference block serving as the next search center (Step a5). Next, the end judgment unit 204 judges whether or not the reference block that is determined by the search center determination unit 205 as the next search center is the same as the reference block serving as the previous search center (Step a6). If the judgment in Step a6 is that the reference blocks serving as the next and previous search centers are the same (Yes in Step a6), the end judgment unit 204 ends the motion estimation, and outputs the motion vector mvmin of the minimum-error block as the motion vector MVout estimated by the motion vector estimation unit 106 (Step a7).

Meanwhile, if the judgment in Step a6 is that the reference blocks serving as the next and previous search centers are not the same (No in Step a6), Step a2 to Step a6 are repeated.

Next, a detailed description is given of processing (Step a5) for determining a reference block serving as the next search center.

The search center determination unit 205 determines a reference block serving as the next search center depending on the position of the minimum-error block determined by the minimum-error block determination unit 203 (Step b1). More specifically, the search center determination unit 205 determines a reference block serving as the next search center, depending on the motion vector mvmin of the current minimum-error block and the motion vector mvcenter of the reference block serving as the current search center, with reference to the conversion table as shown in FIG. 9A.

Next, the search center determination unit 205 rounds the value of the horizontal component of the motion vector mvcenter of the reference block that has been determined as the next search center, so that such horizontal component of the motion vector mvcenter is included in the search area (Step b2). Then, the search center determination unit 205 rounds the value of the vertical component of the motion vector mvcenter of the reference block that has been determined as the next search center, so that such vertical component of the motion vector mvcenter is included in the search area (Step b3).

As described above, it is possible to reduce the number of times for which a reference block serving as the next search center is shifted to another one and thus to achieve fast motion estimation, since (i) a minimum-error block is determined by calculating, in parallel, errors of a total of nine reference blocks (one reference block serving as a search center and its eight neighboring reference blocks that are away from it by one pixel each in the up, down, left, and right directions and the four slanting directions), and (ii) a reference block serving as the next search center is determined depending on the position of the determined minimum-error block, so that the amount of shift to such newly determined search center is two pixels or more away from the reference block serving as the current search center. This makes it possible to perform motion estimation within a predetermined length of time even if the current block is a block with large motion, for example.

Note that in the present embodiment, the error calculation unit 202 calculates, in parallel, errors of nine reference blocks, that is, a reference block serving as the search center and its eight neighboring reference blocks that are away from it by one pixel each in the up, down, left, and right directions and the four slanting directions, but the present invention is not limited to this. Therefore, the error calculation unit 202 may calculate, in parallel, errors of a total of the following 25 reference blocks: 1 reference block serving as the search center and its 24 surrounding reference blocks that are away from it by one pixel and two pixels each in the up, down, left, and right directions and the four slanting directions.

In this case, when the minimum-error block is located in the position indicated by the pixel in the right center as shown in FIG. 5C, for example, the search center determination unit 205 determines, as the next search center, a reference block that is away from the current search center by five pixels in the right direction. When the minimum-error block is located in the position indicated by the second pixel from the upper right corner as shown in FIG. 5D, for example, the search center determination unit 205 determines, as the next search center, a reference block that is away from the current search center by five pixels in the right direction and one pixel in the up direction. When the minimum-error block is located in the position indicated by the pixel in the upper right corner as shown in FIG. 5E, for example, the search center determination unit 205 determines, as the next search center, a reference block that is away from the current search center by four pixels in the right direction and four pixels in the up direction. In other words, the search center determination unit 205 is required to hold the conversion table as shown in FIG. 9B.

Also in the above case, the end judgment unit 204 judges that the motion estimation should be ended in the following cases, for example: the minimum-error block in the previous error calculation is a reference block located in the position indicated by the pixel in the right center and the minimum-error block in the current error calculation is not any of the reference blocks at the edges on which the previous and current error calculations are performed, as shown in FIG. 7C; the minimum-error block in the previous error calculation is located in the position indicated by the second pixel from the upper right corner and the minimum-error block in the current error calculation is not any of the reference blocks at the edges on which the previous and current error calculations are performed, as shown in FIG. 7D; and the minimum-error block in the previous error calculation is a reference block located in the position indicated by the pixel in the upper right corner and the minimum-error block in the current error calculation is not any of the reference blocks at the edges on which the previous error calculation is performed, as shown in FIG. 7E.

Moreover, the present embodiment has a structure in which the error calculation unit 202 has the first error calculation unit 202a, the second error calculation unit 202b, the third error calculation unit 202c, ..., and the ninth error calculation unit 202i, thereby making it possible to calculate, in parallel, errors of the reference block serving as a search center and its surrounding reference blocks, but the present invention is not limited to this structure. Therefore, it is possible to embody the present invention as software, which is applicable to a processor and the like having a plurality of arithmetic units, for example.

Second Embodiment

In the first embodiment, the end judgment unit 204 judges whether or not motion estimation should be ended, but the second embodiment presents the case where judgment of whether to end motion estimation or not is made by use of a counter, in addition to end judgment made by the end judgment unit 204.

Figure 10:
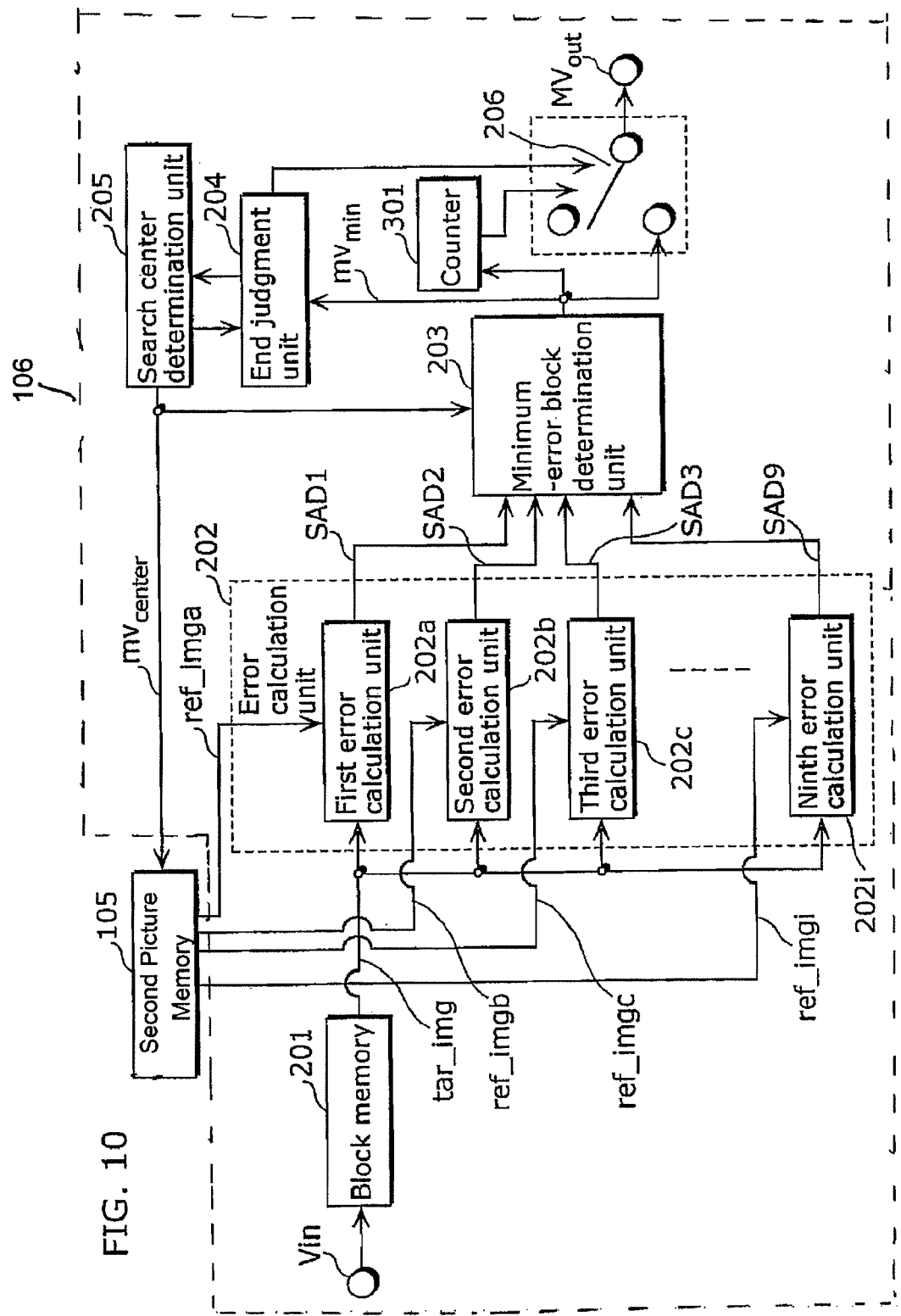
FIG. 10 is a block diagram showing another structure of the motion estimation unit that uses a motion estimation method according to the second embodiment of the present invention.

FIG. 10 is a block diagram showing another structure of the motion estimation unit 106 shown in FIG. 3. In FIG. 10, components and the like that are the same as those illustrated in FIG. 4 are assigned the same reference numbers, and descriptions thereof will not be repeated.

The motion estimation unit 106 includes a counter 301, in addition to the components presented in the first embodiment. The counter 301 counts the number of times for which motion vectors mvmin are outputted from the minimum-error block determination unit 203, i.e., the number of times for which a reference block serving as a search center has been updated.

Then, the counter 301 turns the switch 206ON, when such counted number of times reaches a predetermined threshold TH_me_cnt. As a result, a motion vector mvmin outputted by the minimum-error block determination unit 203 is outputted as a motion vector MVout estimated by the motion vector estimation unit 106. Meanwhile, the counter 301 turns the switch 206 OFF, when the above counted number of times is less than the predetermined threshold TH_me_cnt.

Figure 11:
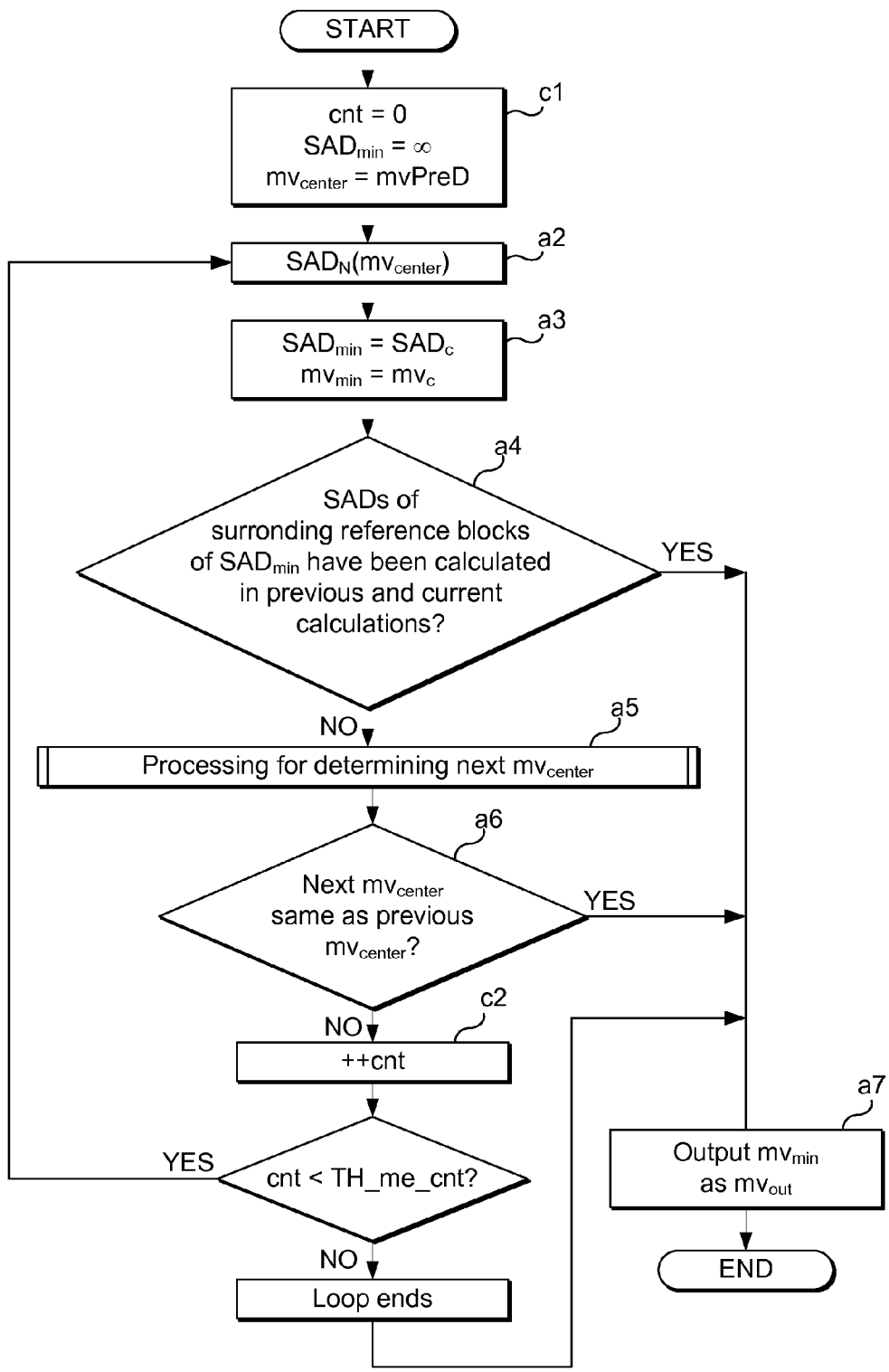
FIG. 11 is a flowchart showing a flow of operations for performing motion estimation by use of a counter.

FIG. 11 is a flowchart showing a flow of operations for performing motion estimation by use of the counter. In FIG. 11, operations that are the same as those shown in FIG. 8A are assigned the same step numbers, and detailed descriptions thereof will not be repeated.

The following gives only the differences between the operations shown in FIG. 8A of the first embodiment and those of the second embodiment. First, a number cnt is initialized to zero, in addition to initializing the minimum error SADmin to ∞ and substituting the initial value mvPred of a reference block serving as a search center to the value of a search center mvcenter (Step c1).

In the case where the judgment in Step a6 of whether or not the reference block serving as the next search center is the same as the reference block serving as the previous search center, is that the reference blocks serving as the next and previous search centers are not the same (No in Step a6), the counter 301 increments the number cnt by one (Step c2), and processes from Step a2 through to Step a6 are repeated until the number cnt reaches the predetermined threshold TH_me_cnt.

When the number cnt reaches the predetermined threshold TH_me_cnt, the repetition of the processes from Step a2 to Step a6 is terminated, and the motion vector mvmin of the current minimum-error block is outputted as the motion vector MVout estimated by the motion vector estimation unit 106 (Step a7).

As described above, since motion estimation is ended also in the case where the number of times counted by the counter 301 reaches the predetermined threshold TH_me_cnt in addition to depending on the result of judgment made by the end judgment unit 204, it becomes possible to end motion estimation within a predetermined length of time, for example, if it is necessary.

Note that the first and second embodiments use summed absolute difference (SAD) as a comparative error between the current block and each reference block, but the present invention is not limited to this. Thus, it is possible to use sum of squared differences or the like, for example, as a comparative error between the current block and each reference block.

Third Embodiment

Furthermore, if a program for implementing the motion estimation method as shown in the aforementioned embodiments is recorded on a recording medium such as a flexible disk, it becomes possible to easily perform the processing presented in the above embodiments in an independent computer system.

Figure 12A:
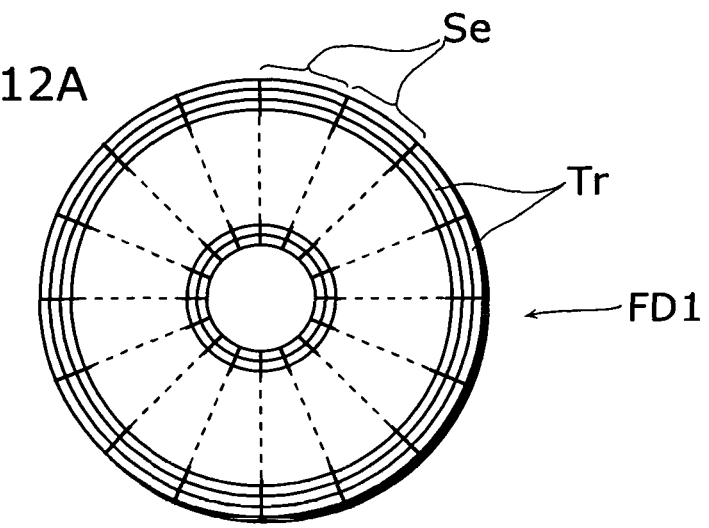
FIGS. 12A to 12C are diagrams illustrating a recording medium that stores a program for realizing, by a computer system, the motion estimation method and the moving picture coding method according to each of the above embodiments, where
Figure 12B:
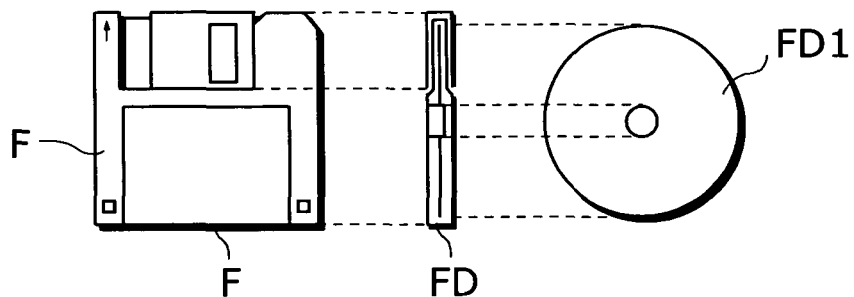
Figure 12C:
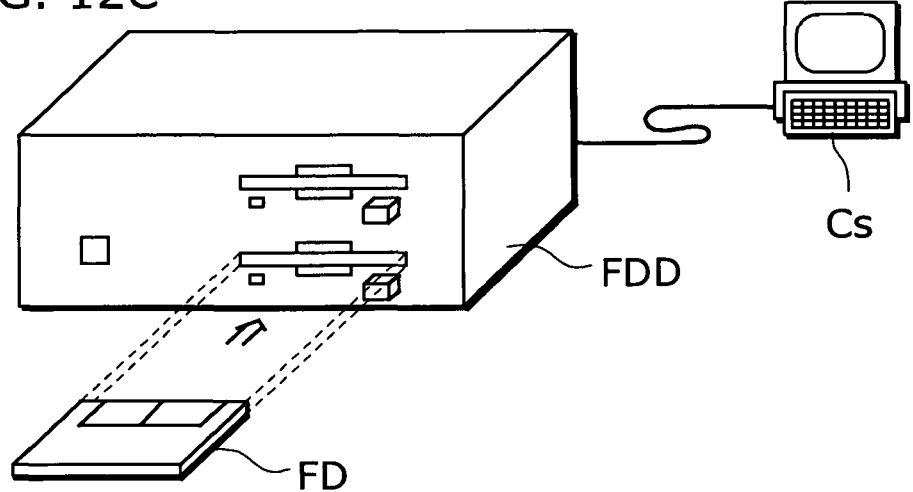

FIGS. 12A, 12B, and 12C are diagrams for illustrating the case where the motion estimation method according to the above embodiments is carried out in a computer system, using a program that is stored in a recording medium such as a flexible disk.

FIG. 12B shows an external view of a flexible disk viewed from the front, its schematic cross-sectional view, and the flexible disk itself, while FIG. 12A illustrates an example physical format of the flexible disk as a recording medium itself. The flexible disk FD is contained in a case F, and a plurality of tracks Tr are formed concentrically on the surface of the flexible disk FD in the radius direction from the periphery, each track being divided into 16 sectors Se in the angular direction. Therefore, in the flexible disk storing the above-mentioned program, the motion estimation method as such program is recorded in an area allocated for it on the flexible disk FD.

Meanwhile, FIG. 12C shows the structure required for recording and reading out the program on and from the flexible disk FD. When the program realizing the above motion estimation method is to be recorded onto the flexible disk FD, such program shall be written by the use of the computer system Cs via a flexible disk drive FDD. Meanwhile, when the motion estimation method is to be constructed in the computer system Cs through the program on the flexible disk FD, the program shall be read out from the flexible disk FD via the flexible disk drive FDD and then transferred to the computer system Cs.

The above description is given on the assumption that a recording medium is a flexible disk, but an optical disc may also be used. In addition, the recording medium is not limited to this, and any other medium such as an IC card and a ROM cassette capable of recording a program can also be used.

Fourth Embodiment

The following describes applications of the motion estimation method presented in the aforementioned embodiments as well as a system using the same.

Figure 13:
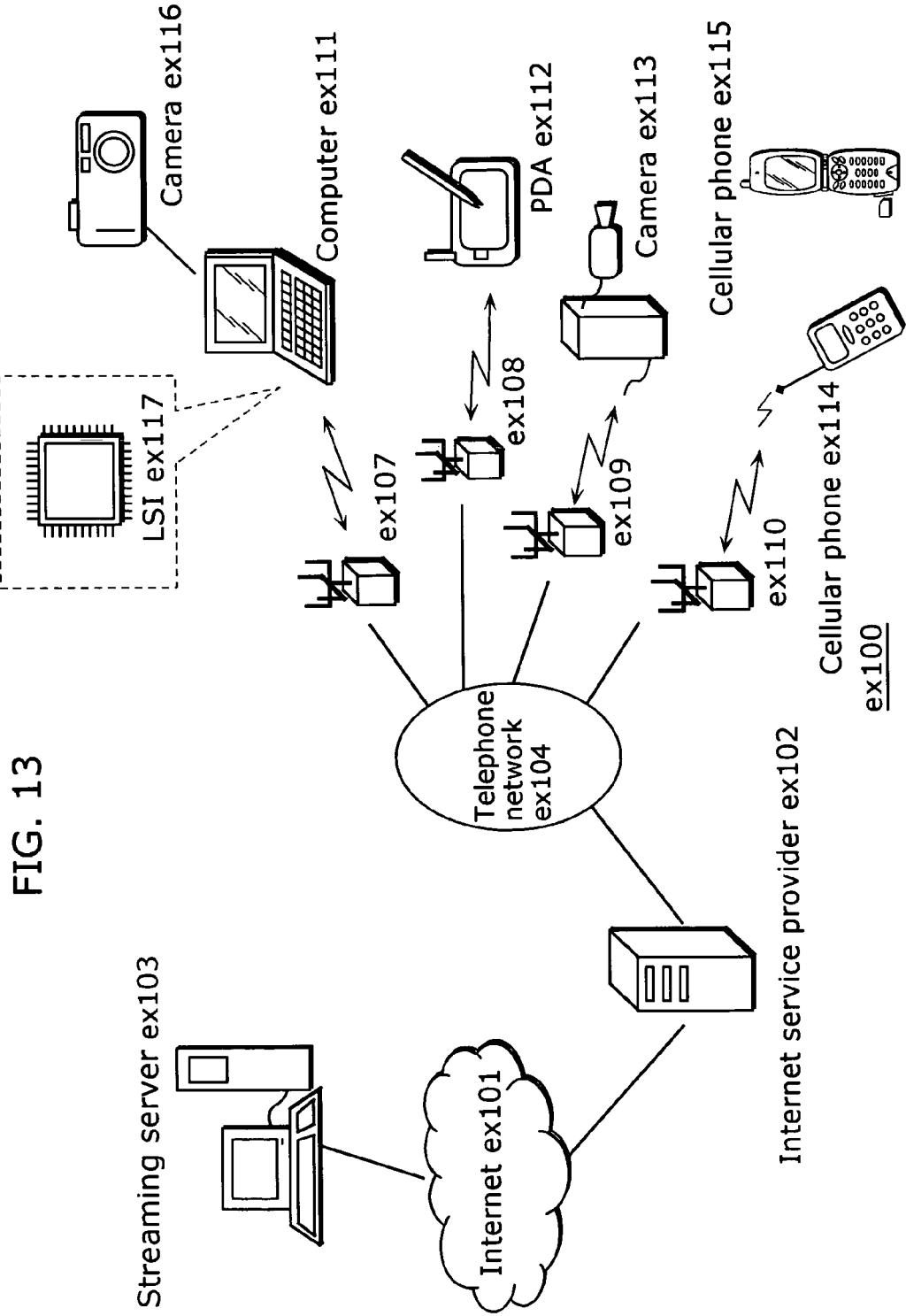
FIG. 13 is a block diagram showing an overall configuration of a content supply system.

FIG. 13 is a block diagram showing an overall configuration of a content supply system ex100 that realizes a content distribution service. The area for providing a communication service is divided into cells of desired size, and base stations ex107 to ex110, which are fixed wireless stations, are placed in the respective cells.

In this content supply system ex100, devices such as a computer ex111, a PDA (Personal Digital Assistant) ex112, a camera ex113, a cellular phone ex114, and a camera-equipped cellular phone ex115 are respectively connected to the Internet ex101 via an Internet service provider ex102, a telephone network ex104, and the base stations ex107 to ex110.

However, the content supply system ex100 is not limited to the combination as shown in FIG. 13, and may be connected to a combination of any of them. Also, each of the devices may be connected directly to the telephone network ex104, not via the base stations ex107 to ex110, which are fixed wireless stations.

The camera ex113 is a device such as a digital video camera capable of shooting moving pictures. The cellular phone may be a cellular phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone system) or the like, and may be any one of these.

Furthermore, a streaming server ex103 is connected to the camera ex113 via the base station ex109 and the telephone network ex104, which enables live distribution or the like based on coded data transmitted by the user using the camera ex113. Either the camera ex113 or a server and the like capable of data transmission processing may code the shot data. Also, moving picture data shot by a camera ex116 may be transmitted to the streaming server ex103 via the computer ex111. The camera ex116 is a device such as a digital camera capable of shooting still pictures and moving pictures. In this case, either the camera ex116 or the computer ex111 may code the moving picture data. In this case, an LSI ex117 included in the computer ex111 or the camera ex116 performs coding processing. Note that software for coding and decoding may be integrated into a certain type of storage medium (such as a CD-ROM, a flexible disk and a hard disk) that is a recording medium readable by the computer ex111 and the like. Furthermore, the camera-equipped cellular phone ex115 may transmit the moving picture data. This moving picture data is data coded by an LSI included in the cellular phone ex115.

In this content supply system ex100, content (e.g. a music live video) which has been shot by the user using the camera ex113, the camera ex116 or the like is coded in the same manner as the above-described embodiments and transmitted to the streaming server ex103, and the streaming server ex103 makes stream distribution of the content data to clients at their request. The clients here include the computer ex111, the PDA ex112, the camera ex113, the cellular phone ex114 and so forth capable of decoding the above coded data. The content supply system ex100 with the above configuration is a system that enables the clients to receive and reproduce the coded data and realizes personal broadcasting by allowing them to receive, decode and reproduce the data in real time.

The motion estimation presented in the aforementioned embodiments serves as the motion estimation unit used for coding processing that constitutes the present system.

An explanation is given of a cellular phone as an example.

Figure 14:
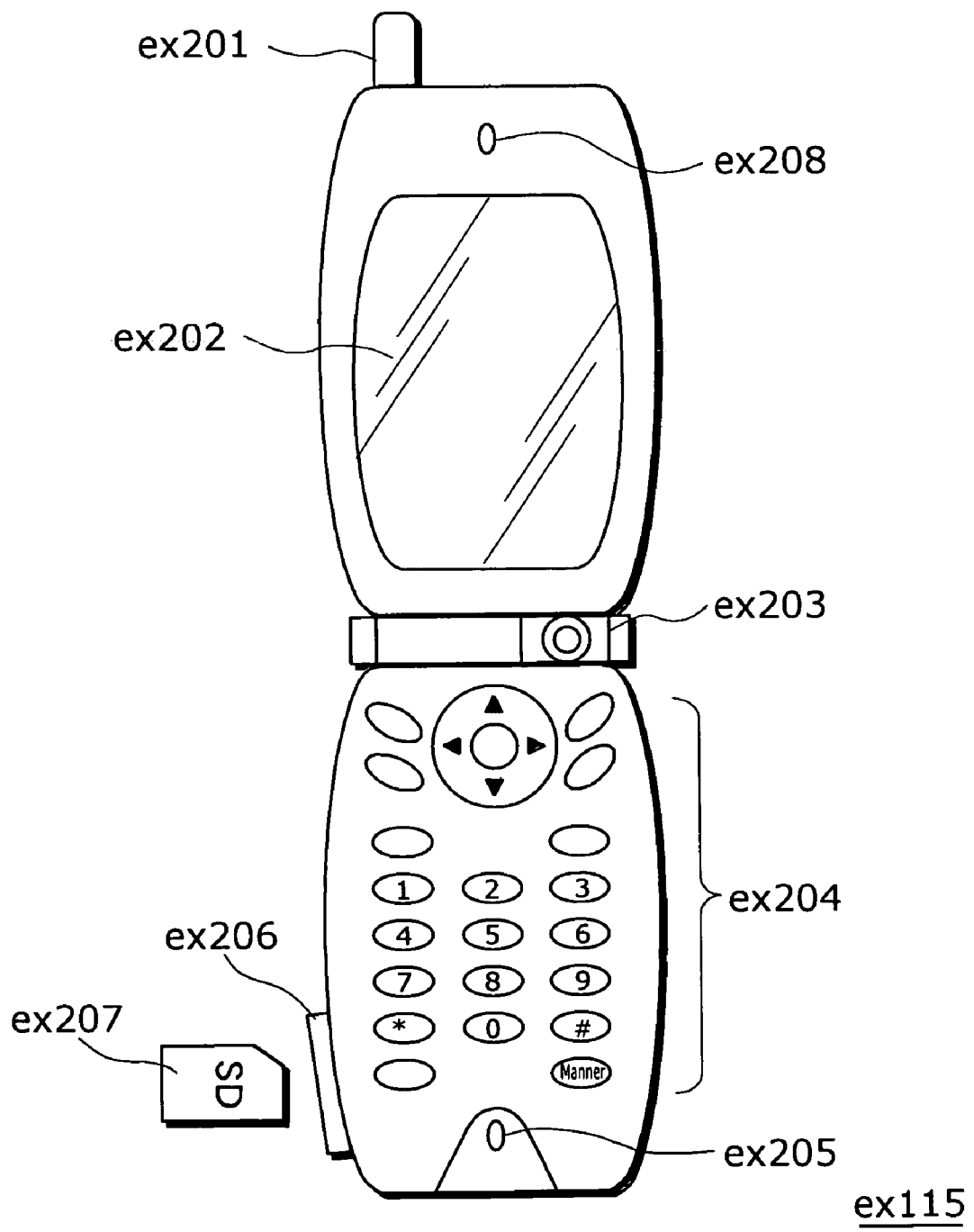
FIG. 14 is a schematic diagram showing an example of a cellular phone.

FIG. 14 is a diagram showing the cellular phone ex115 that employs the motion estimation method explained in the above embodiments. The cellular phone ex115 has an antenna ex201 for transmitting/receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and video and the like received by the antenna ex201, a main body equipped with a group of operation keys ex204, a voice output unit ex208 such as a speaker for outputting voices, a voice input unit ex205 such as a microphone for inputting voices, a recording medium ex207 for storing coded data or decoded data such as data of moving pictures or still pictures shot by the camera, data of received e-mails and moving picture data or still picture data, and a slot unit ex206 for enabling the recording medium ex207 to be attached to the cellular phone ex115. The recording medium ex207 is embodied as a flash memory element, a kind of EEPROM (Electrically Erasable and Programmable Read Only Memory) that is an electrically erasable and rewritable nonvolatile memory, stored in a plastic case such as an SD card.

Figure 15:
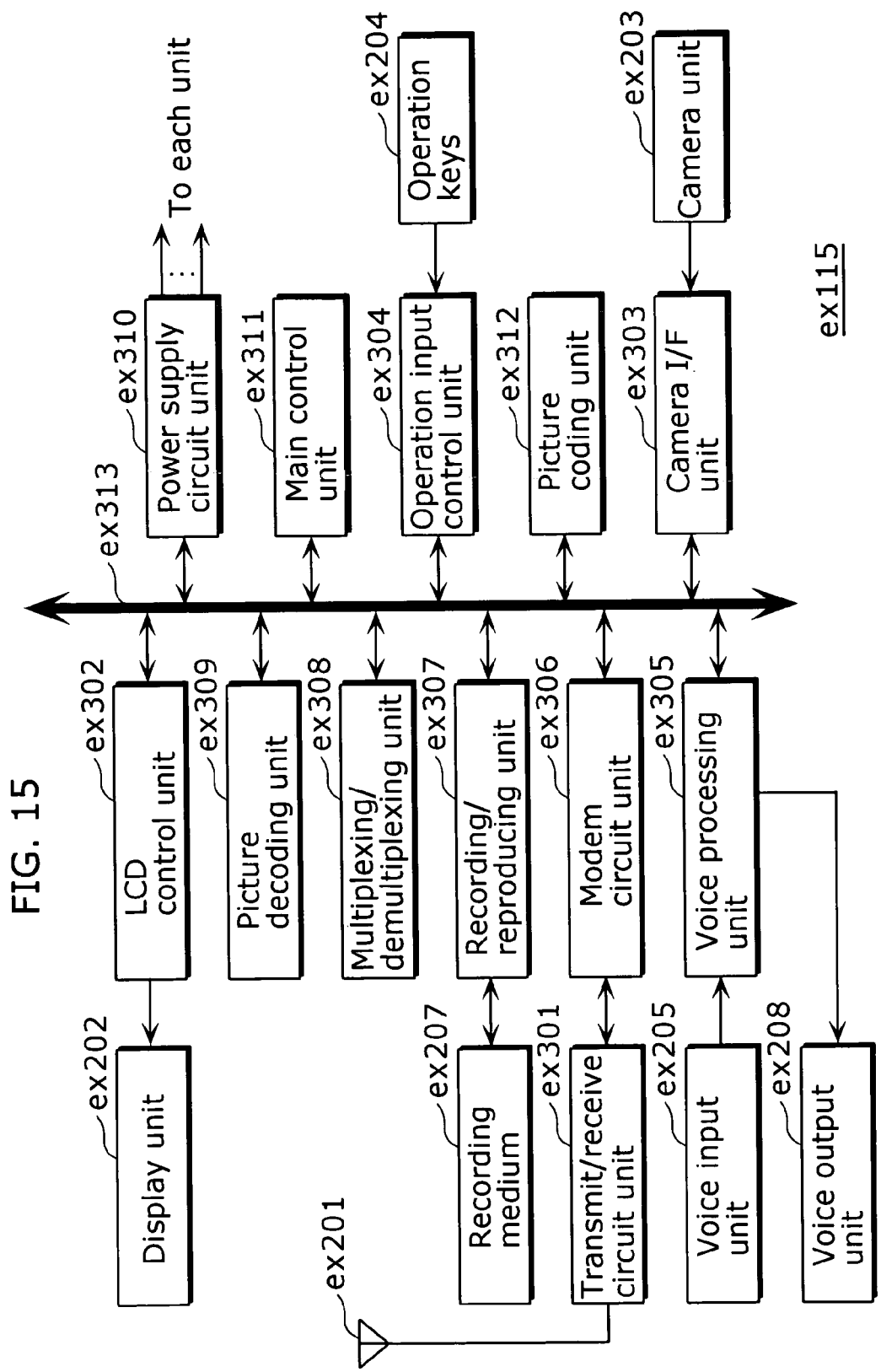
FIG. 15 is a block diagram showing a construction of the cellular phone.

Next, referring to FIG. 15, a description is given of the cellular phone ex115. In the cellular phone ex115, a main control unit ex311 for centrally controlling the display unit ex202 and each unit of the main body having the operation keys ex204 is configured in a manner in which a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a recording/reproducing unit ex307, a modem circuit unit ex306, and a voice processing unit ex305 are interconnected via a synchronous bus ex313.

When a call-end key or a power key is turned on by a user operation, the power supply circuit unit ex310 supplies each unit with power from a battery pack, and activates the camera-equipped digital cellular phone ex115 to make it into a ready state.

In the cellular phone ex115, the voice processing unit ex305 converts a voice signal received by the voice input unit ex205 in conversation mode into digital voice data under the control of the main control unit ex311 comprised of a CPU, a ROM, a RAM and others, the modem circuit unit ex306 performs spread spectrum processing on it, and a transmit/receive circuit unit ex301 performs digital-to-analog conversion processing and frequency transformation processing on the data, so as to transmit the resultant via the antenna ex201. Also, in the cellular phone ex115, data received by the antenna ex201 in conversation mode is amplified and performed of frequency transformation processing and analog-to-digital conversion processing, the modem circuit unit ex306 performs inverse spread spectrum processing on the resultant, and the voice processing unit ex305 converts it into analog voice data, so as to output it via the voice output unit ex208.

Furthermore, when sending an e-mail in data communication mode, text data of the e-mail inputted by operating the operation keys ex204 on the main body is sent out to the main control unit ex311 via the operation input control unit ex304. In the main control unit ex311, after the modem circuit unit ex306 performs spread spectrum processing on the text data and the transmit/receive circuit unit ex301 performs digital-to-analog conversion processing and frequency transformation processing on it, the resultant is transmitted to the base station ex110 via the antenna ex201.

When picture data is transmitted in data communication mode, the picture data shot by the camera unit ex203 is supplied to the picture coding unit ex312 via the camera interface unit ex303. When picture data is not to be transmitted, it is also possible to display such picture data shot by the camera unit ex203 directly on the display unit ex202 via the camera interface unit ex303 and the LCD control unit ex302.

The picture coding unit ex312, which includes the moving picture coding apparatus according to the present invention, performs compression coding on the picture data supplied from the camera unit ex203 using the coding method employed by the moving picture coding apparatus presented in the above embodiments, so as to convert it into coded picture data, and sends it out to the multiplexing/demultiplexing unit ex308. At this time, the cellular phone ex115 sends voices received by the voice input unit ex205 while the shooting by the camera unit ex203 is taking place, to the multiplexing/demultiplexing unit ex308 as digital voice data via the voice processing unit ex305.

The multiplexing/demultiplexing unit ex308 multiplexes the coded picture data supplied from the picture coding unit ex312 and the voice data supplied from the voice processing unit ex305 using a predetermined method, the modem circuit unit ex306 performs spread spectrum processing on the resulting multiplexed data, and the transmit/receive circuit unit ex301 performs digital-to-analog conversion processing and frequency transformation processing on the resultant, so as to transmit the processed data via the antenna ex201.

When receiving, in data communication mode, moving picture file data which is linked to a Web page or the like, the modem circuit unit ex306 performs inverse spread spectrum processing on the received data received from the base station ex110 via the antenna ex201, and sends out the resulting multiplexed data to the multiplexing/demultiplexing unit ex308.

In order to decode the multiplexed data received via the antenna ex201, the multiplexing/demultiplexing unit ex308 separates the multiplexed data into a bitstream of picture data and a bitstream of voice data, and supplies such coded picture data to the picture decoding unit ex309 and such voice data to the voice processing unit ex305 via the synchronous bus ex313.

Next, the picture decoding unit ex309 decodes the bitstream of the picture data using the decoding method paired with the coding method shown in the above-mentioned embodiments so as to generate moving picture data for reproduction, and supplies such data to the display unit ex202 via the LCD control unit ex302. Accordingly, moving picture data included in the moving picture file linked to a Web page, for instance, is displayed. At the same time, the voice processing unit ex305 converts the voice data into an analog voice signal, and then supplies this to the voice output unit ex208. Accordingly, voice data included in the moving picture file linked to a Web page, for instance, is reproduced.

Figure 16:
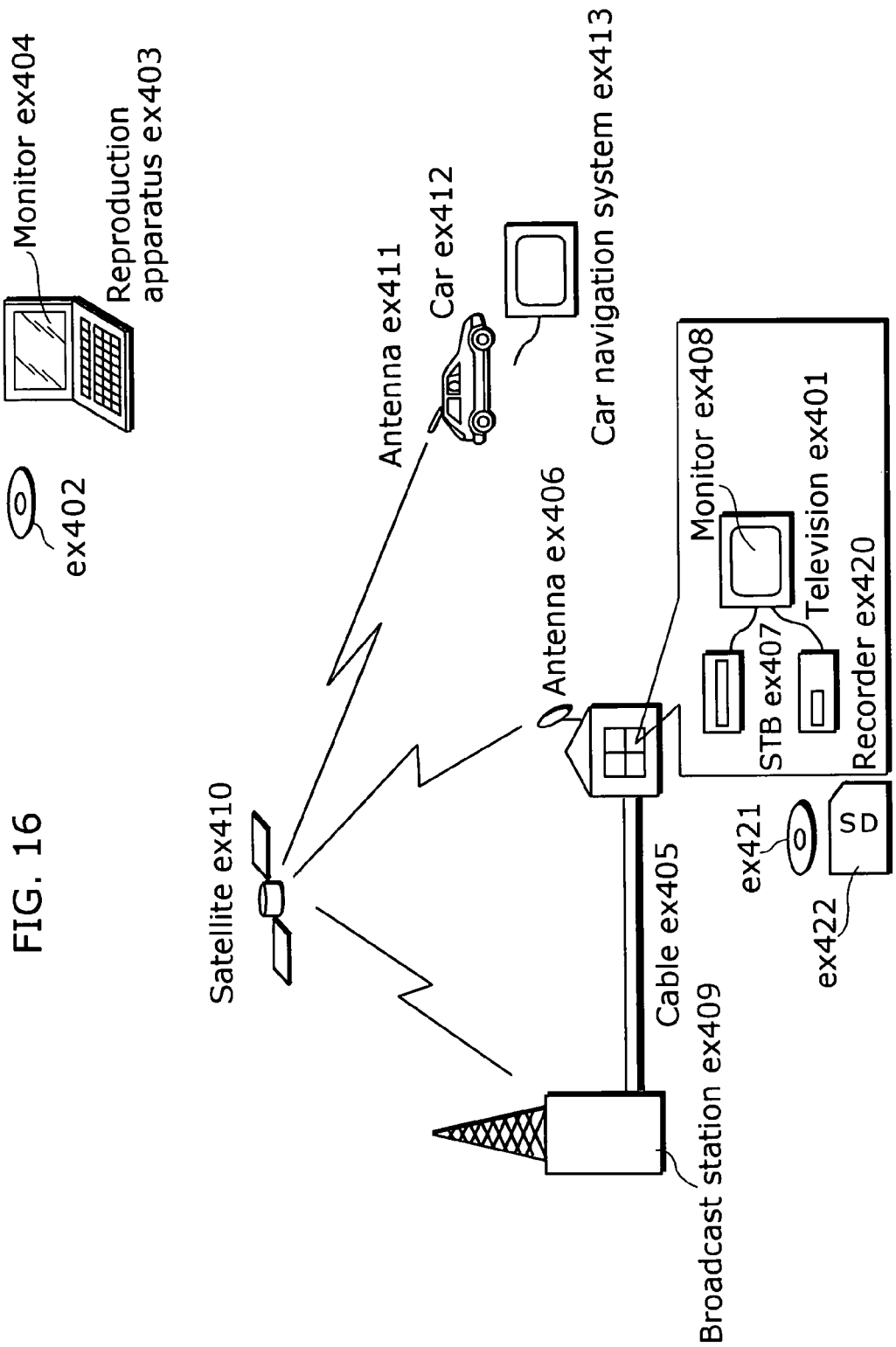
FIG. 16 is a diagram showing an example of a digital broadcasting system.

Note that the aforementioned system is not an exclusive example and therefore that the moving picture coding apparatus of the above embodiments can be incorporated into a digital broadcasting system as shown in FIG. 16, against the backdrop that satellite/terrestrial digital broadcasting has been a recent topic of conversation. To be more specific, at a broadcasting station ex409, a bitstream of video information is transmitted, by radio waves, to a satellite ex410 for communications or broadcasting. Upon receipt of it, the broadcast satellite ex410 transmits radio waves for broadcasting, an antenna ex406 of a house equipped with satellite broadcasting reception facilities receives such radio waves, and an apparatus such as a television (receiver) ex401 and a set top box (STP) ex407 decodes the bitstream and reproduces the decoded data. A moving picture decoding apparatus can be implemented in the reproduction apparatus ex403 for reading and decoding the bitstream recorded on a storage medium ex402 that is a recording medium such as a CD and a DVD. In this case, a reproduced video signal is displayed on a monitor ex404. It is also conceivable that the moving picture decoding apparatus is implemented in the set top box ex407 connected to a cable ex405 for cable television or the antenna ex406 for satellite/terrestrial broadcasting so as to reproduce it on a television monitor ex408. In this case, the moving picture decoding apparatus may be incorporated into the television, not in the set top box. Or, a car ex412 with an antenna ex411 can receive a signal from the satellite ex410, the base station ex107 or the like, so as to reproduce a moving picture on a display device such as a car navigation system ex413 mounted on the car ex412.

Furthermore, it is also possible to code a picture signal by the moving picture coding apparatus presented in the above embodiments and to record the resultant in a recording medium. Examples include a DVD recorder for recording a picture signal on a DVD disc ex421 and a recorder ex420 such as a disc recorder for recording a picture signal on a hard disk. Moreover, a picture signal can also be recorded in an SD card ex422. If the recorder ex420 is equipped with a moving picture decoding apparatus, it is possible to reproduce a picture signal recorded on the DVD disc ex421 or in the SD card ex422, and display it on the monitor ex408.

As the configuration of the car navigation system ex413, the configuration without the camera unit ex203 and the camera interface unit ex303, out of the configuration shown in FIG. 15, is conceivable. The same is applicable to the computer ex111, the television (receiver) ex401 and the like.

Concerning the terminals such as the cellular phone ex114, a transmitting/receiving terminal having both an encoder and a decoder, as well as a transmitting terminal only with an encoder, and a receiving terminal only with a decoder are possible as forms of implementation.

As stated above, it is possible to employ the motion estimation method presented in the above embodiments into any one of the above-described devices and systems. Accordingly, it becomes possible to achieve the effect described in the aforementioned embodiments.

Note that each function block in the block diagram shown in FIGS. 3, 4, 10, and 11 are typically implemented as an LSI that is an integrated circuit apparatus. Such LSI may be incorporated in one or plural chip form (e.g. function blocks other than a memory may be incorporated into a single chip). Here, LSI is taken as an example, but it can be called "IC", "system LSI", "super LSI" and "ultra LSI" depending on the integration degree.

The method for incorporation into an integrated circuit is not limited to the LSI, and it may be realized with a personal circuit or a general processor. It is also possible to utilize a Field Programmable Gate Array (FPGA) that is programmable after manufacturing of LSI, or a reconfigurable processor in which the connection and settings for the circuit cell in the LSI can be reconfigurable after manufacturing of LSI.

Furthermore, along with the arrival of technique for incorporation into an integrated circuit that replaces the LSI owing to a progress in semiconductor technology or another technique that has deviated from it, integration of the function blocks may be carried out using the newly-arrived technology. Bio-technology may be cited as one of the examples.

Among the function blocks, only a unit for storing data to be coded or decoded may be constructed separately without being incorporated in a chip form.

As stated above, the motion estimation method and moving picture coding method according to the present invention are applicable as methods and the like used by a mobile phone, a DVD apparatus, and a personal computer, and the like for estimating motion in a moving picture and generating a coded stream by coding each picture constituting a moving picture.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A motion estimation method for estimating, on a block-by-block basis, a motion vector that indicates an amount of motion between pictures that constitute a moving picture, said method comprising:
    searching through blocks of a reference picture, said searching being repeated for at least two iterations until the estimation of the motion vectors ends, and said searching including
        i) calculating an error between a current block and a current search center reference block and an error between the current block and each reference block within a search range of the current search center reference block, the current block being included in a current picture on which the motion estimation is performed, and the current search center reference block being included in the reference picture, wherein said calculating is performed using a processor and is performed for each iteration of said searching,
        ii) determining, from among the current search center reference block and the neighboring reference blocks, a minimum-error block that is a reference block with a smallest error of all the errors calculated in a current iteration of said searching, wherein said determining of the minimum-error block is performed for each iteration of said searching,
        iii) judging whether or not the motion estimation should be ended, said judging occurring only during second and subsequent iterations of said searching, and not performing another iteration of said searching if it is judged that motion estimation should be ended, wherein the second and subsequent iterations of said searching occur after a first iteration of said searching, and
        iv) determining, as an immediately subsequent search center, a reference block that is a) away from the current search center reference block by two pixels or more, b) different from the current search center reference block for which the error between the current block is calculated, and c) different from each of the reference blocks within the search range for which the error between the current block is calculated in the current iteration of said searching, based on a position of the minimum-error block determined in the current iteration of said searching, and causing an immediately subsequent iteration to the current iteration of said searching to be executed, wherein said determining of the reference block is performed for each iteration of said searching when it is judged in said judging that motion estimation should not be ended; and
    determining a motion vector indicating the position of the minimum-error block determined in a current iteration of the second or subsequent iterations of said searching, as the motion vector to be estimated, when it is judged in said judging that the motion estimation should be ended.

2. The motion estimation method according to claim 1, wherein in said judging, it is judged that the motion estimation should be ended in one of the following cases: all reference blocks surrounding the minimum-error block are the reference blocks whose errors have been calculated in a previous iteration or the current iteration of the second or subsequent iterations of said searching; and the reference block determined in the current iteration of the second or subsequent iterations of said searching to serve as the immediately subsequent search center is the same as the reference block serving as a previous search center, the minimum-error block being determined in the current iteration of the second or subsequent iterations of said searching.

3. The motion estimation method according to claim 1, wherein the reference blocks within the search range are: reference blocks that are away from the current search center reference block by i pixel to left and right horizontally, respectively, where i is a natural number that is equal to or smaller than P, which is a natural number; reference blocks that are away from the current search center reference block by j pixel to up and down vertically, respectively, where j is a natural number that is equal to or smaller than Q, which is a natural number; and reference blocks that are away from the current search center reference block by i pixel to left and right horizontally, respectively, and by j pixel to up and down vertically, respectively, and
in said calculating, the errors are calculated in parallel for a total of $(2P+1)\times(2Q+1)$ reference blocks which are the current search center reference block and the reference blocks within the search range.

4. The motion estimation method according to claim 1, wherein in said determining of the reference block serving as the immediately subsequent search center, the reference block determined as the immediately subsequent search center is away from the current search center reference block by 2M+1 pixels horizontally, where M is an integer, in the case where the minimum-error block determined in the current iteration of said searching is away from the current search center reference block by M pixel horizontally.

5. The motion estimation method according to claim 1, wherein in said determining of the reference block serving as the immediately subsequent search center, the reference block determined as the immediately subsequent search center is away from the current search center reference block by 2N+1 pixels vertically, where N is an integer, in the case where the minimum-error block determined in the current iteration of said searching is away from the current search center reference block by N pixel vertically.

6. The motion estimation method according to claim 1, wherein in said determining of the reference block serving as the immediately subsequent search center, the reference block determined as the immediately subsequent search center is away from the current search center reference block by 2M pixels horizontally and 2N pixels vertically, where M and N are integers, in the case where the minimum-error block determined in the current iteration of said searching is away from the current search center reference block by M pixel horizontally and by N pixel vertically.

7. The motion estimation method according to claim 1, wherein in said determining of the reference block serving as the immediately subsequent search center, the reference block serving as the immediately subsequent search center is determined so that the determined reference block serving as the immediately subsequent search center and neighboring reference blocks of the determined reference block are included in a predetermined search area.

8. The motion estimation method according to claim 1, further comprising counting a number of times for which the calculation is performed in said calculating, wherein it is judged that the motion estimation should be ended when the number of times counted in said counting exceeds a predetermined number.

9. A moving picture coding method for coding a picture constituting a moving picture on a block-by-block basis, said method comprising:
   searching through blocks of a reference picture, said searching being repeated for at least two iterations until the estimation of the motion vector ends, and said searching including
   i) calculating an error between a current block and a current search center reference block and an error between the current block and each reference block within a search range of the current search center reference block, the current block being included in a current picture on which the motion estimation is performed, and the current search center reference block being included in the reference picture, wherein said calculating is performed using a processor and is performed for each iteration of said searching,
   ii) determining, from among the current search center reference block and the neighboring reference blocks, a minimum-error block that is a reference block with a smallest error of all the errors calculated in a current iteration of said searching, wherein said determining of the minimum-error block is performed for each iteration of said searching,
   iii) judging whether or not the motion estimation should be ended, said judging occurring only during second and subsequent iterations of said searching, and not performing another iteration of said searching if it is judged that motion estimation should be ended, wherein the second and subsequent iterations of said searching occur after a first iteration of said searching, and
   iv) determining, as an immediately subsequent search center, a reference block that is a) away from the current search center reference block by two pixels or more, b) different from the current search center reference block for which the error between the current block is calculated, and c) different from each of the reference blocks within the search range for which the error between the current block is calculated in the current iteration of said searching, based on a position of the minimum-error block determined in the current iteration of said searching, and causing an immediately subsequent iteration to the current iteration of said searching to be executed, wherein said determining of the reference block is performed for each iteration of said searching when it is judged in said judging that motion estimation should not be ended;
   determining a motion vector indicating the position of the minimum-error block determined in a current iteration of the second or subsequent iterations of said searching, as the motion vector to be estimated, when it is judged in said judging that the motion estimation should be ended; and
   coding the moving picture based on the motion vector determined in said determining of the motion vector.

10. A motion estimation apparatus that estimates, on a block-by-block basis, a motion vector that indicates an amount of motion between pictures that constitute a moving picture, said apparatus comprising:
   a search unit operable to perform searching through blocks of a reference picture and the searching being repeated for at least two iterations until the estimation of the motion vector ends, said search unit includes
      an error calculation unit operable to calculate an error between a current block and a current search center reference block and an error between the current block and each reference block within a search range of the current search center reference block, the current block being included in a current picture on which the motion estimation is performed, and the current search center reference block being included in the reference picture, wherein said error calculation unit calculates the error for each iteration of the searching,
      a minimum-error block determination unit operable to determine, from among the current search center reference block and the neighboring reference blocks, a minimum-error block that is a reference block with a smallest error of all the errors calculated by said error calculation unit in a current iteration of the searching, wherein said minimum-error block determination unit determines the minimum-error block for each iteration of the searching,
      an end judgment unit operable to judge whether or not the motion estimation should be ended, said end judgment unit performs judging only during second and subsequent iterations of the searching, and causes said search unit to not perform a next iteration of the searching if said end judgment unit judges that motion estimation should be ended, wherein the second and subsequent iterations of the searching occur after a first iteration of the searching, and a search center determination unit operable to determine, as an immediately subsequent search center, a reference block that is a) away from the current search center reference block by two pixels or more, b) different from the current search center reference block for which the error between the current block is calculated, and c) different from each of the reference blocks within the search range for which the error between the current block is calculated in the current iteration of the searching, depending on a position of the minimum-error block determined by said minimum-error block determination unit in the current iteration of the searching, and to cause said error calculation unit to perform the calculating for an immediately subsequent iteration to the current iteration of the searching, wherein said search center determination unit determines the reference block for each iteration of the searching when it is judged by said end judgment unit that motion estimation should not be ended; and a motion vector estimation unit operable to determine a motion vector indicating the position of the minimum-error block determined by said minimum-error block determination unit in a current iteration of the second or subsequent iterations of the searching, as the motion vector to be estimated, when said end judgment unit judges that the motion estimation should be ended.

11. A computer-readable recording medium on which a program is stored, the program being for estimating, on a block-by-block basis, a motion vector that indicates an amount of motion between pictures that constitute a moving picture wherein the program causes a computer to execute:

searching through blocks of a reference picture, said searching being repeated for at least two iterations until the estimation of the motion vector ends, and said searching including i) calculating an error between a current block and a current search center reference block and an error between the current block and each reference block within a search range of the current search center reference block, the current block being included in a current picture on which the motion estimation is performed, and the current search center reference block being included in the reference picture, wherein said calculating is performed using a processor and is performed for each iteration of said searching, ii) determining, from among the current search center reference block and the neighboring reference blocks, a minimum-error block that is a reference block with a smallest error of all the errors calculated in a current iteration of said searching, wherein said determining of the minimum-error block is performed for each iteration of said searching, iii) judging whether or not the motion estimation should be ended, said judging occurring only during second and subsequent iterations of said searching, and not performing another iteration of said searching if it is judged that motion estimation should be ended, wherein the second and subsequent iterations of said searching occur after a first iteration of said searching, and iv) determining, as an immediately subsequent search center, a reference block that is a) away from the current search center reference block by two pixels or more, b) different from the current search center reference block for which the error between the current block is calculated, and c) different from each of the reference blocks within the search range for which the error between the current block is calculated in the current iteration of said searching, based on a position of the minimum-error block determined in the current iteration of said searching, and causing an immediately subsequent iteration to the current iteration of said searching to be executed, wherein said determining of the reference block is performed for each iteration of said searching when it is judged in said judging that motion estimation should not be ended; and determining a motion vector indicating the position of the minimum-error block determined in a current iteration of the second or subsequent iterations of said searching, as the motion vector to be estimated, when it is judged in said judging that the motion estimation should be ended.

12. An integrated circuit that estimates, on a block-by-block basis, a motion vector that indicates an amount of motion between pictures that constitute a moving picture, said integrated circuit comprising:

a search unit operable to perform searching through blocks of a reference picture and the searching being repeated for at least two iterations until the estimation of the motion vector ends, said search unit includes an error calculation unit operable to calculate an error between a current block and a current search center reference block and an error between the current block and each reference block within a search range of the current search center reference block, the current block being included in a current picture on which the motion estimation is performed, and the current search center reference block being included in the reference picture, wherein said error calculation unit calculates the error for each iteration of the searching, a minimum-error block determination unit operable to determine, from among the current search center reference block and the neighboring reference blocks, a minimum-error block that is a reference block with a smallest error of all the errors calculated by said error calculation unit in a current iteration of the searching, wherein said minimum-error block determination unit determines the minimum-error block for each iteration of the searching, and an end judgment unit operable to judge whether or not the motion estimation should be ended, said end judgment unit performs judging only during second and subsequent iterations of the searching, and causes said error calculation unit to not perform the calculating for a next iteration of the searching if said end judgment unit judges that motion estimation should be ended, wherein the second and subsequent iterations of the searching occur after a first iteration of the searching, a search center determination unit operable to determine, as an immediately subsequent search center, a reference block that is a) away from the current search center reference block by two pixels or more, b) different from the current search center reference block for which the error between the current block is calculated, and c) different from each of the reference blocks within the search range for which the error between the current block is calculated in the current iteration of the searching, depending on a position of the minimum-error block determined by said minimum-error block determination unit in the current iteration of the searching, and to cause said error calculation unit to perform the calculating for an immediately subsequent iteration to the current iteration of the searching, wherein said search center determination unit determines the reference block for each iteration of the searching when it is judged by said end judgment unit that motion estimation should not be ended; and a motion vector estimation unit operable to determine a motion vector indicating the position of the minimum-error block determined by said minimum-error block determination unit in a current iteration of the second or subsequent iterations of searching, as the motion vector to be estimated, when said end judgment unit judges that the motion estimation should be ended.

* * * * *